United States Patent
Sharifi et al.

(10) Patent No.: US 11,089,457 B2
(45) Date of Patent: Aug. 10, 2021

(54) PERSONALIZED ENTITY REPOSITORY

(71) Applicant: Google LLC, Mountain View, CA (US)

(72) Inventors: Matthew Sharifi, Kilchberg (CH); Jorge Pereira, Seattle, WA (US); Dominik Roblek, Meilen (CH); Julian Odell, Kirkland, WA (US); Cong Li, Mountain View, CA (US); David Petrou, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 190 days.

(21) Appl. No.: 16/241,704

(22) Filed: Jan. 7, 2019

(65) Prior Publication Data

US 2020/0226187 A1 Jul. 16, 2020

Related U.S. Application Data

(63) Continuation of application No. 14/962,415, filed on Dec. 8, 2015, now Pat. No. 10,178,527.

(Continued)

(51) Int. Cl.
*H04W 4/18* (2009.01)
*H04W 4/60* (2018.01)
(Continued)

(52) U.S. Cl.
CPC .............. *H04W 4/60* (2018.02); *G06F 16/23* (2019.01); *G06F 16/235* (2019.01);
(Continued)

(58) Field of Classification Search
None
See application file for complete search history.

(56) References Cited

U.S. PATENT DOCUMENTS

| 5,731,844 A | 3/1998 | Rauch |
| 5,946,647 A | 8/1999 | Miller et al. |

(Continued)

FOREIGN PATENT DOCUMENTS

| CN | 1476567 | 2/2004 |
| CN | 101075236 | 11/2007 |

(Continued)

OTHER PUBLICATIONS

Intellectual Property India: Examination Report issued for Application No. 201747044773 dated Aug. 26, 2020.

(Continued)

*Primary Examiner* — Dai Phuong
(74) *Attorney, Agent, or Firm* — Middleton Reutlinger

(57) ABSTRACT

Systems and methods are provided for a personalized entity repository. For example, a computing device comprises a personalized entity repository having fixed sets of entities from an entity repository stored at a server, a processor, and memory storing instructions that cause the computing device to identify fixed sets of entities that are relevant to a user based on context associated with the computing device, rank the fixed sets by relevancy, and update the personalized entity repository using selected sets determined based on the rank and on set usage parameters applicable to the user. In another example, a method includes generating fixed sets of entities from an entity repository, including location-based sets and topic-based sets, and providing a subset of the fixed sets to a client, the client requesting the subset based on the client's location and on items identified in content generated for display on the client.

17 Claims, 9 Drawing Sheets

Related U.S. Application Data

(60) Provisional application No. 62/245,241, filed on Oct. 22, 2015.

(51) Int. Cl.

| | | |
|---|---|---|
| *G06F 16/248* | (2019.01) | |
| *G06F 16/9535* | (2019.01) | |
| *G06F 16/2457* | (2019.01) | |
| *H04W 4/029* | (2018.01) | |
| *G06F 16/907* | (2019.01) | |
| *G06F 16/587* | (2019.01) | |
| *G06K 9/32* | (2006.01) | |
| *H04L 29/08* | (2006.01) | |
| *G06F 16/23* | (2019.01) | |

(52) U.S. Cl.
CPC ........ *G06F 16/2358* (2019.01); *G06F 16/248* (2019.01); *G06F 16/24578* (2019.01); *G06F 16/587* (2019.01); *G06F 16/907* (2019.01); *G06F 16/9535* (2019.01); *G06K 9/325* (2013.01); *H04L 67/22* (2013.01); *H04W 4/029* (2018.02); *H04W 4/18* (2013.01)

(56) References Cited

U.S. PATENT DOCUMENTS

| | | |
|---|---|---|
| 6,662,226 B1 | 12/2003 | Wang et al. |
| 7,054,917 B1 | 5/2006 | Kirsch et al. |
| 7,421,153 B1 | 9/2008 | Ronca et al. |
| 7,548,915 B2 | 6/2009 | Ramer et al. |
| 7,822,759 B2 | 10/2010 | MacLaurin et al. |
| 7,917,514 B2 | 3/2011 | Lawler et al. |
| 8,150,911 B2 | 4/2012 | Bell et al. |
| 8,204,966 B1 | 6/2012 | Mendis et al. |
| 8,255,386 B1 | 8/2012 | Annau et al. |
| 8,280,414 B1 | 10/2012 | Nourse et al. |
| 8,341,156 B1 | 12/2012 | Westgate et al. |
| 8,347,237 B2 | 1/2013 | Bier et al. |
| 8,418,055 B2 | 4/2013 | King et al. |
| 8,452,799 B2 | 5/2013 | Zhou et al. |
| 8,468,110 B1 | 6/2013 | Podgorny et al. |
| 8,571,319 B2 | 10/2013 | Balasubramanian et al. |
| 8,645,325 B2 | 2/2014 | Anderson et al. |
| 8,671,341 B1 | 3/2014 | Hellwig et al. |
| 8,700,604 B2 | 4/2014 | Roseman et al. |
| 8,767,497 B2 | 7/2014 | Marumoto et al. |
| 8,954,836 B1 | 2/2015 | Look et al. |
| 8,977,639 B2 | 3/2015 | Petrou et al. |
| 9,165,406 B1 | 10/2015 | Gray et al. |
| 9,274,839 B2 | 3/2016 | Schluessler et al. |
| 9,354,778 B2 | 5/2016 | Cornaby et al. |
| 9,703,541 B2 | 7/2017 | Sharifi et al. |
| 9,762,651 B1 | 9/2017 | Sharifi et al. |
| 2004/0117750 A1 | 6/2004 | Skoll et al. |
| 2005/0083413 A1 | 4/2005 | Reed et al. |
| 2006/0047639 A1 | 3/2006 | King et al. |
| 2006/0080594 A1 | 4/2006 | Chavoustie et al. |
| 2006/0106844 A1 | 5/2006 | Naick et al. |
| 2006/0156222 A1 | 7/2006 | Chi et al. |
| 2006/0221409 A1 | 10/2006 | Cohen et al. |
| 2006/0253491 A1 | 11/2006 | Gokturk et al. |
| 2007/0008321 A1 | 1/2007 | Gallagher et al. |
| 2007/0047781 A1 | 3/2007 | Hull et al. |
| 2007/0143345 A1 | 6/2007 | Jones et al. |
| 2007/0168379 A1 | 7/2007 | Patel et al. |
| 2008/0176606 A1 | 7/2008 | Kim |
| 2008/0235018 A1 | 9/2008 | Eggen et al. |
| 2008/0275701 A1 | 11/2008 | Wu et al. |
| 2008/0281974 A1 | 11/2008 | Slothouber et al. |
| 2008/0301101 A1 | 12/2008 | Baratto et al. |
| 2009/0005003 A1 | 1/2009 | Hartwell |
| 2009/0006388 A1 | 1/2009 | Ives et al. |
| 2009/0036215 A1 | 2/2009 | Saeki |
| 2009/0063431 A1 | 3/2009 | Erol et al. |
| 2009/0228573 A1 | 9/2009 | Asakawa et al. |
| 2009/0282012 A1 | 11/2009 | Konig et al. |
| 2009/0319449 A1 | 12/2009 | Gamon et al. |
| 2010/0060655 A1 | 3/2010 | Huang |
| 2010/0088612 A1 | 4/2010 | Jia et al. |
| 2010/0250598 A1 | 9/2010 | Brauer et al. |
| 2010/0262928 A1 | 10/2010 | Abbott |
| 2010/0325127 A1 | 12/2010 | Chaudhuri et al. |
| 2011/0072455 A1 | 3/2011 | Pickelsimer et al. |
| 2011/0123115 A1* | 5/2011 | Lee .................. H04N 5/23212 |
| | | 382/185 |
| 2011/0125735 A1 | 5/2011 | Petrou |
| 2011/0128288 A1 | 6/2011 | Petrou et al. |
| 2011/0131160 A1 | 6/2011 | Canny et al. |
| 2011/0131235 A1 | 6/2011 | Petrou et al. |
| 2011/0145692 A1 | 6/2011 | Noyes et al. |
| 2011/0225152 A1 | 9/2011 | Beaudreau et al. |
| 2011/0238768 A1 | 9/2011 | Habets et al. |
| 2011/0246471 A1 | 10/2011 | Rakib |
| 2011/0307478 A1 | 12/2011 | Pinckney et al. |
| 2011/0307483 A1 | 12/2011 | Radlinski et al. |
| 2012/0044137 A1 | 2/2012 | Oddiraju et al. |
| 2012/0083294 A1 | 4/2012 | Bray et al. |
| 2012/0117058 A1 | 5/2012 | Rubinstein et al. |
| 2012/0158751 A1 | 6/2012 | Tseng |
| 2012/0194519 A1 | 8/2012 | Bissell et al. |
| 2012/0239761 A1 | 9/2012 | Linner et al. |
| 2013/0073988 A1 | 3/2013 | Groten et al. |
| 2013/0080447 A1 | 3/2013 | Ramer et al. |
| 2013/0091463 A1 | 4/2013 | Nordstrom et al. |
| 2013/0097507 A1 | 4/2013 | Prewett |
| 2013/0108161 A1 | 5/2013 | Carr |
| 2013/0111328 A1 | 5/2013 | Khanna et al. |
| 2013/0117252 A1 | 5/2013 | Samaddar et al. |
| 2013/0173604 A1 | 7/2013 | Li et al. |
| 2013/0254217 A1 | 9/2013 | Xu |
| 2013/0263098 A1 | 10/2013 | Duda et al. |
| 2013/0290110 A1 | 10/2013 | Luvogt et al. |
| 2013/0325844 A1 | 12/2013 | Plaisant |
| 2013/0346431 A1 | 12/2013 | Erol et al. |
| 2014/0029810 A1 | 1/2014 | Barr et al. |
| 2014/0040272 A1 | 2/2014 | Houghton |
| 2014/0082670 A1 | 3/2014 | Papish |
| 2014/0089626 A1* | 3/2014 | Schluessler ......... G06F 9/45558 |
| | | 711/170 |
| 2014/0118597 A1 | 5/2014 | Tabak et al. |
| 2014/0142922 A1 | 5/2014 | Liang et al. |
| 2014/0146200 A1 | 5/2014 | Scott et al. |
| 2014/0152655 A1 | 6/2014 | Johnston et al. |
| 2014/0157210 A1 | 6/2014 | Katz et al. |
| 2014/0188889 A1 | 7/2014 | Martens et al. |
| 2014/0250147 A1 | 9/2014 | Shapira et al. |
| 2014/0279013 A1 | 9/2014 | Chelly et al. |
| 2014/0282660 A1 | 9/2014 | Oztaskent et al. |
| 2014/0316890 A1 | 10/2014 | Kagan |
| 2014/0366158 A1 | 12/2014 | Han et al. |
| 2015/0016700 A1 | 1/2015 | Drozdzal et al. |
| 2015/0019997 A1 | 1/2015 | Kim et al. |
| 2015/0095855 A1 | 4/2015 | Bai et al. |
| 2015/0100524 A1 | 4/2015 | Pantel et al. |
| 2015/0169701 A1 | 6/2015 | Stekkelpak et al. |
| 2015/0178786 A1 | 6/2015 | Claessens |
| 2015/0212695 A1 | 7/2015 | Nordstrom et al. |
| 2015/0317649 A1 | 11/2015 | Joshi et al. |
| 2016/0055246 A1 | 2/2016 | Marcin et al. |
| 2016/0098640 A1 | 4/2016 | Su |
| 2016/0140671 A1 | 5/2016 | Hong |
| 2016/0321052 A1 | 11/2016 | Sharifi et al. |
| 2017/0098159 A1 | 4/2017 | Sharifi et al. |
| 2017/0139879 A1 | 5/2017 | Sharifi et al. |
| 2017/0293950 A1 | 10/2017 | Rathod |
| 2019/0028418 A1* | 1/2019 | Ban .................. H04M 1/72552 |
| 2019/0220616 A1* | 7/2019 | Lacey .................. G06F 21/32 |

FOREIGN PATENT DOCUMENTS

| | | |
|---|---|---|
| CN | 101201827 | 6/2008 |
| CN | 101587495 | 11/2009 |
| CN | 101763357 | 6/2010 |

(56) References Cited

FOREIGN PATENT DOCUMENTS

| | | |
|---|---|---|
| CN | 103888455 | 6/2014 |
| CN | 104036002 | 9/2014 |
| CN | 104486350 | 4/2015 |
| CN | 104838413 | 8/2015 |
| EP | 2306290 | 4/2011 |
| EP | 2466921 | 6/2012 |
| EP | 2728481 | 5/2014 |
| EP | 2824558 | 1/2015 |
| JP | 201196173 A | 5/2011 |
| RU | 2383921 C2 | 3/2010 |
| WO | 03088080 | 10/2003 |
| WO | 2009054619 | 4/2009 |
| WO | WO2010006241 A1 | 1/2010 |
| WO | WO2010091320 A1 | 8/2010 |
| WO | 2012075315 | 6/2012 |
| WO | 2013173940 | 11/2013 |
| WO | WO2013172958 A1 | 11/2013 |
| WO | WO2013173626 A2 | 11/2013 |
| WO | 2014105922 | 7/2014 |
| WO | 2014146265 | 9/2014 |
| WO | 2016064857 | 4/2016 |

OTHER PUBLICATIONS

The Korean Patent Office; Notice of Allowance issued in Application No. 10-2018-7014398 dated Nov. 13, 2019 dated Nov. 13, 2019.

Collobert, et al., Natural Language Processing (almost) from Scratch; Journal of Machine Learning Research; vol. 12; pp. 2493-2537; dated Aug. 1, 2011.

Hsu, et al.; Snap2Read: Automatic Magazine Capturing and Analysis for Adaptive Mobile Reading; Lecture Notes in Computer Science; vol. 6524; 11 pages; dated 2011.

Minkov, et al.; Extracting Personal Names from Email: Applying Named Entity Recognition to Informal Text; Proceedings of Human Language Technology Conference and Conference on Empirical Methods in Natural Language Processing; 8 pages; dated Oct. 1, 2005.

Adistambha, et al.; Efficient multimedia query-by-content from mobile devices; Computers & Electrical Engineering, vol. 36, No. 4; 6 pages; dated 2010.

Russian Patent Office; Office Action issued in Application No. 2018113725 dated Feb. 11, 2019.

European Patent Office: Examination Report issued for Application No. 16858056.1 dated Jun. 8, 2020.

The European Patent Office; Extended European Search Report issued in Application No. 16858056.1 dated Apr. 1, 2019.

The Japanese Patent Office; Office Action issued in Application No. 2018-520605 dated Jun. 17, 2019.

The Russian Patent Office; Decision to Grant issued in Application No. 2018113725 dated May 20, 2019.

The Korean Patent Office; Office Action issued in Application No. 10-2018-7014398 dated Apr. 30, 2019.

The Japanese Patent Office; Notice of Allowance issued in Application No. 2018-520605; 3 pages; dated Jan. 6, 2020.

China National Intellectual Property Administration; Notification of First Office Action issued in Application No. 201680061369.0; 27 pages; dated Apr. 15, 2021.

Great Britain Patent Office; Examination Report issued in Application No. 1806100.2; 7 pages; dated Jun. 25, 2021.

European Patent Office; Intention to Grant issued in Application No. 16858056.1; 53 pages; dated Jun. 10, 2021.

* cited by examiner

PERSONALIZED ENTITY REPOSITORY

BACKGROUND

The use of mobile devices, such as smart phones, wearable devices, tablets, laptops, etc., has been increasing. By understanding the content viewed by and actions taken by a user, the mobile device can build a much better user experience, for example by offering personalized predictions and assistance to the user. Part of understanding the content and actions involves identifying and classifying entities recognized in the content of the device screen. The entities may exist in an entity repository, such as a knowledge base or vision model, which stores facts and information about entities. Large, public entity repositories may include millions of such entities. Most computing devices, especially mobile computing devices, such as smart phones and tablets, have limited storage and use the entity repository via a connection with a server.

SUMMARY

Implementations divide an entity repository into several fixed sets or slices. A set may be location-based, topic-based, action-based, or functional. The system may determine the sets at a server and provide only those sets to a client device that are relevant to that particular client. The sets downloaded to the client are a personalized entity repository that can be accessed without connection to the server. The client device may include a set identification engine. The set identification engine may include a prediction model that predicts one or more sets given some text, images, or other features. The prediction model may be used to determine which sets are most beneficial to the user. The set identification engine may also track a location of the user to determine which location sets may be most relevant.

Sets may be ranked for the user of the client device, e.g., based on the user's location, a user's search history, content the user has been viewing on the device, time of day, signals from other devices, etc. Thus, for example, if a user begins researching a trip to Hawaii, the system may determine that a set with entities related to Hawaii is particularly relevant to the user. If a user flies from New York to Los Angeles, the system may determine location sets for Los Angeles are relevant. The client device may use the rankings to determine which sets to retrieve and which to delete from memory. For example, if a set previously downloaded is no longer relevant, the system may remove that set to make room for another set. The system may employ set usage parameters to determine which sets to include in the personalized entity repository at any time. In some implementations, the user may establish and control the set usage parameters. Updating a set may include determining a delta for the set to reduce the data transferred to the client device. In some implementations, the sets may be versioned, e.g., so that a schema change does not break the applications using the model.

According to certain aspects of the disclosure, a mobile device comprises a display device, a personalized entity repository stored in memory, the personalized entity repository including a plurality of fixed sets of entities from an entity repository stored at a server, wherein each fixed set has a respective identifier and includes information about the entities in the set, at least one processor, and memory storing instructions that, when executed by the at least one processor, cause the mobile device to perform operations. The operation include identifying fixed sets of the entity repository that are relevant to a user of the mobile device based on context associated with the mobile device, ranking the fixed sets by relevancy, determining selected sets from the identified fixed sets using the rank and set usage parameters applicable to the user, and updating the personalized entity repository using the selected sets.

According to certain aspects of the disclosure, a method includes receive a screen captured image configured to display content on a display of a mobile device, determining text in the image by performing text recognition on the image, providing the text to a set prediction model, wherein the set prediction model is trained to predict one or more fixed sets of entities, and storing at least one fixed set of entities of the predicted fixed sets of entities in a personalized entity repository in memory on the mobile device.

According to certain aspects of the disclosure, a method may include generating a plurality of fixed sets of entities from an entity repository. The fixed sets include location-based sets, each location-based set including entities from the entity repository that have a location inside a cell, the cell being associated with the set, and topic-based sets, at least some of the topic-based sets including entities from the entity repository that are related to each other via an embedding similarity. The method may also include providing a subset of the fixed sets of entities to a client device, the client device requesting the subset based on a location of the client device and on recognized items identified in content generated for display on the client device.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for generating fixed sets of entities in an entity repository and providing some of the fixed sets to a personal computing device as a personal entity repository, substantially as shown in and/or described in connection with at least one of the figures, and as set forth more completely in the claims.

One or more of the implementations of the subject matter described herein can be implemented so as to realize one or more of the following advantages. As one example, generating fixed sets of entities enables the system to provide personal or custom entity repositories in a scalable way. The customized entity repository can aid in on-device text analysis and image analysis to support user assistance capabilities even without connectivity to a network. The user may control the amount of resources dedicated to the personal entity repository and the system may automatically determine which sets best utilize the allocated resources. As another example, the system may predict which sets are most relevant to a user. The prediction may be based on a number of factors specific to the user and/or the personal computing device, such as location, time of day, signals from other computing devices associated with the user or known to the device, recent activity on the computing device, etc. As another example, implementations may support versioning of the sets, so that a change that restructures the information in the set does not break applications that use the set.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
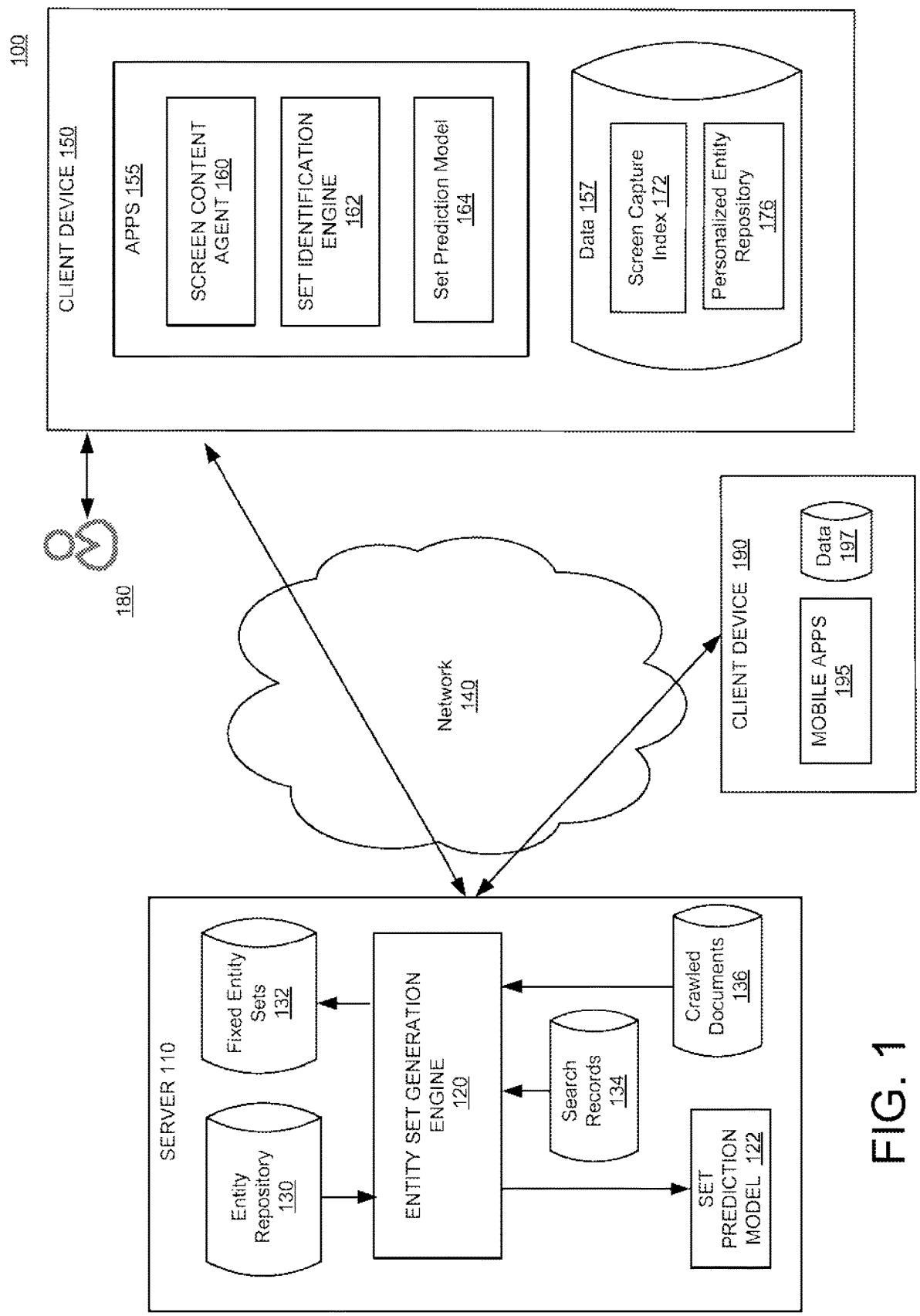
FIG. 1 is a block diagram illustrating an example system in accordance with the disclosed subject matter.

FIG. 1 is a block diagram of a personal entity repository system in accordance with an example implementation. The system 100 may be used to build a personalized entity repository from selections of pre-computed or fixed sets of entities. The sets are fixed in the sense that they are computed ahead of any particular request for a set, or in other words are not generated in response to a request for a set. The system 100 may determine which sets are most useful at a particular point in time and may update the personalized entity repository to ensure entities in the personalized repository are relevant to the user. Updating the personalized entity repository includes deleting sets that are less relevant to the user now than before and adding new sets that have become relevant. The personalized entity repository may be used to determine entities in content generated for display on a computing device to personalize a user experience on the computing device. Personalizing the user experience can include predicting actions, topics, words, or phrases, etc. The system 100 in FIG. 1 is illustrated as a client-server system, with some data processing or data storage occurring at a server 110 and other data processing occurring at the client device 150. However, other configurations and applications may be used and implementations are not limited to the exact configurations illustrated.

Figure 9:
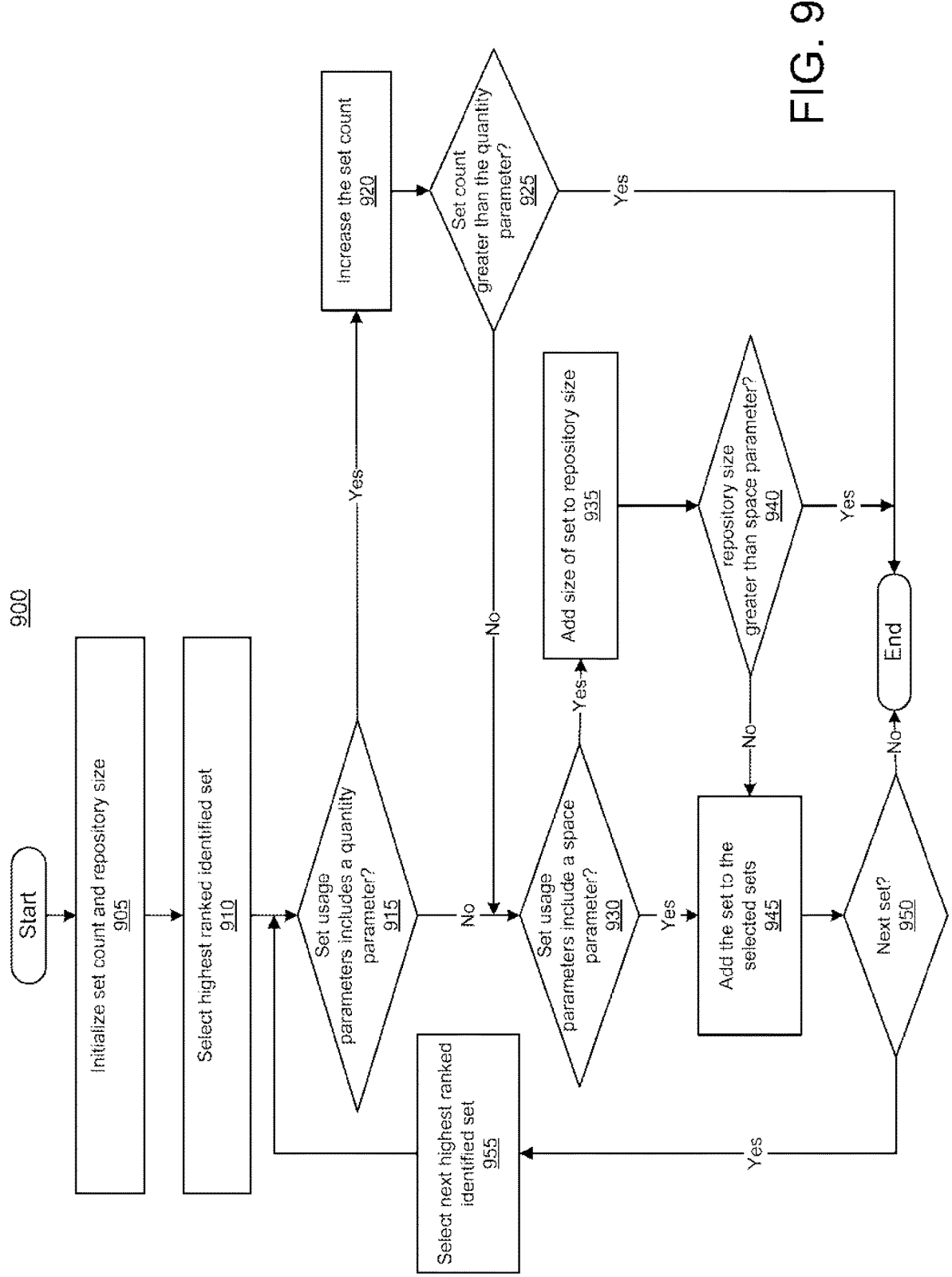
FIG. 9 illustrates a flow diagram of an example process for selecting fixed sets of entities from fixed sets of entities relevant to a user of a client device based on set usage parameters, in accordance with disclosed implementations.
Figure 11:
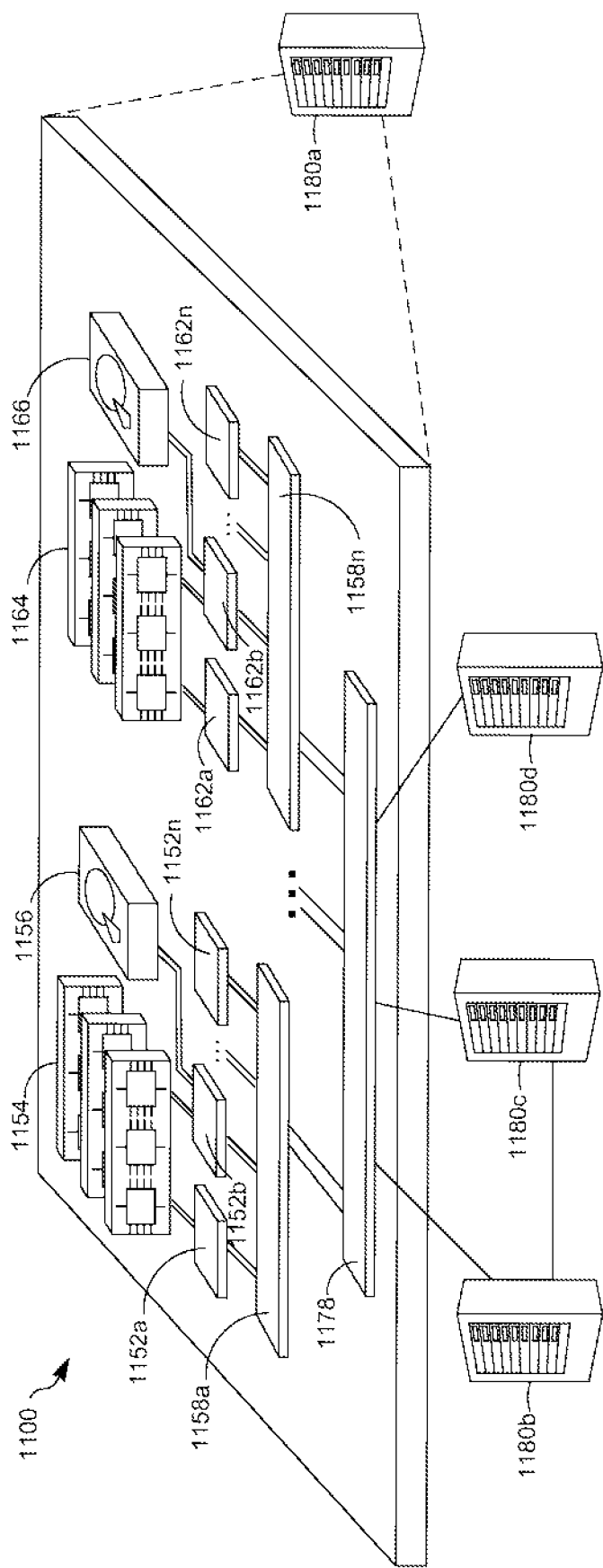
FIG. 11 shows an example of a distributed computer device that can be used to implement the described techniques.

The personalized entity repository system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 900, as depicted in FIG. 9, or computer device 1100, as depicted in FIG. 11. Server 110 may include one or more processors formed in a substrate configured to execute one or more machine executable instructions or pieces of software, firmware, or a combination thereof. The processors can be semiconductor-based—that is, the processors can include semiconductor material that can perform digital logic.

The server 110 may store or have access to entity repository 130. The entity repository 130 may store information about entities. An entity may be may be a person, place, item, idea, topic, word, phrase, abstract concept, concrete element, other suitable thing, or any combination of these. In some implementations, the entity repository 130 may be a knowledge base, which stores information about entities. In some implementations, a knowledge base stores information about entities in the form of relationships between entities. For example, entities in a knowledge base may be related to each other by labeled edges that represent relationships. The knowledge base may also store attributes of an entity. Some knowledge bases are large, sometimes including millions of entities. A knowledge base with a large number of entities and even a limited number of relationships may have billions of connections.

The entity repository 130 may also include image recognition entities that can be used to identify an entity in an image. For example, the entity repository 130 may include entities that represent known images of the entity and/or characteristics of the image and are used in image recognition processes (e.g., using image similarity techniques) to identify entities in images. For example, the characteristics may be features provided to an image recognition model (e.g., machine learning algorithm). The entity repository 130 may represent a single knowledge base, a combination of distinct knowledge bases, image recognition entities, and/or a combination of a knowledge base and image information. In some implementations, entity repository 130 may be stored in an external storage device accessible to server 110. In some implementations, the entity repository 130 may be distributed across multiple storage devices and/or multiple computing devices, for example multiple servers. The entities and relationships in a knowledge base may be searchable, e.g., via an index. For example, the index may include text by which an entity has been referred to. Thus, reference to the knowledge base may be understood to include an index that facilitates finding an entity using a text equivalent.

The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 110. In some implementations, the modules may include entity set generation engine 120. The entity set generation engine 120 may divide entities in an entity repository 130 into fixed entity sets 132. Each set in the fixed entity sets 132 may be thought of as a slice of the entity repository 130 that includes entities related by some criteria. In some implementations a slice may contain metadata about an entity (e.g., name, description, canonical image), relationships with other entities, and/or information used to detect the entity in text, such as common names, aliases, abbreviations, nicknames, and other signals. Each fixed set of entities in the fixed entity sets 132 may have an identifier so that a particular set can be tracked, identified, and requested by applications or client devices.

In some implementations, the entity set generation engine 120 may generate various types of sets, such as location-based sets, topic-based sets, or functional sets. A location-based set may include entities associated with a particular geographic cell. A geographic cell is an area of the surface of the earth defined by boundaries, for example two lines of latitude and two lines of longitude. Such cells are common for map applications, such as GOOGLE MAPS. A location-based fixed set of entities may include any entities known to be located within the cell. The entity repository 130 may include an attribute that specifies a location for an entity or may include metadata identifying the location. For example, a restaurant entity in entity repository 130 may have a location attribute specifying a particular geo cell or cells or latitude/longitude coordinates. While geo cells, i.e., cells used in a map application, are typically of similar size, location-based entity sets need not correspond to one geo cell but may be based, instead, on an area having a specified number of entities located within the area. Thus, for instance, a cell for a location-based set of entities in New York City may be quite small (e.g., ten square miles) because it is densely populated while a cell for a location-based set of entities in western Wyoming may be hundreds of square miles but have the same number of entities as the cell in New York City. Thus, for example, the entity set generation engine 120 may merge adjacent geo cells until the quantity of entities associated with the merged cell reaches a minimum quantity and forms a location-based cell for a fixed set of entities.

The entity set generation engine 120 may also generate topic-based fixed sets of entities. In some implementations, the entity set generation engine 120 may generate topic-based sets by clustering the entities using conventional clustering techniques based on how related entities are. For example, the clustering may be based on characteristics of the entities, e.g., embeddings, trained on search records or on text such as text from documents indexed for a search engine. In some implementations, the entity set generation engine 120 may be given a seed entity and may form a cluster based on the seed entity. In some implementations, one or more topic-based sets may be based on collections identified in the entity repository. For instance, entities in the entity repository 130 may include an indication of one or more collections that the entity belongs to or the entity repository 130 may include a collection definition, or in other words requirements for inclusion in the collection, and entities may be evaluated against the requirements to determine membership in the collection. The entity set generation engine 120 may use entity membership in the collection to generate one or more of the topic-based sets. In some implementations, the entity set generation engine 120 may compute an embedding for each topic-related slice. The embedding may be used to compute similarity with a query embedding, e.g., generated by a set identification engine, to determine which sets are most similar to the query embedding. For example, the embedding may represent a cluster center.

The entity set generation engine 120 may also generate functional sets of entities. A functional set may include entities that are deemed most popular, e.g., entities that are most frequently searched for or accessed, for example based on appearance in search queries. A functional set may also be based on a capability, for example the capability to translate from one language to another. As another example, a functional set may include entities likely to be encountered when using or requested by a particular application. Of course, these functional sets are provided as examples only and functional entity sets may include any collection of entities common to a particular purpose, characteristic, or function. In some implementations, the entity set generation engine 120 may generate fixed sets of entities that are combinations of the above. For example, the entity set generation engine 120 may generate a fixed set of entities for restaurants in San Jose Calif. or another set for artwork recognition in Paris France. In some implementations, the entity set generation engine 120 may include a user interface that enables a user to curate one or more fixed sets of entities.

The entity set generation engine 120 may also update the fixed sets of entities 132 periodically. For example, as entities are added, deleted, or updated in the entity repository 130 the entity set generation engine 120 may determine changes to the fixed sets. In some implementations, the entity set generation engine 120 may determine deltas for each set, for example a list of entities to be deleted from the fixed set and a list of entities to be added to the fixed set. The entity set generation engine 120 may provide the deltas to the client device 150, either as a push or a pull. The deltas reduce the amount of data transmitted between the server 110 and the client device 150 while still enabling the client device 150 to have the most current entity sets. This is especially useful when a particular fixed entity set changes often, such as a set of entities that represents movies. In some implementations, the entity set generation engine 120 may also version each of the fixed sets, also referred to as slices. For example, the entity set generation engine 120 may change the data format of the slices or may change the slices in another way that breaks the schema. When the schema is broken the applications that uses the slices may need a corresponding update to use the new slices. Accordingly the entity set generation engine 120 may version the fixed sets so that applications that have not been updated may continue to use older versions without malfunctioning. In some instances, the client device 150 may include two versions of the same fixed slice (e.g., a slice representing a particular location), until applications that use the old schema are updated.

In some implementations, the entity set generation engine 120 may also train and maintain a set prediction model 122. A set prediction model, such as set prediction model 122, may be any type of machine-learning algorithm, such as a long short-term memory (LSTM) neural network, feed-forward neural network, a support vector machine (SVM) classifier, etc., that can predict a fixed set of entities given a set of features or signals. The features may include a device location, text or images in content (e.g., documents, search records, etc.), applications typically used for various tasks, etc. As a machine-learning algorithm, the set prediction model has two modes, a training mode and an inference mode. For example, in the training mode the set prediction model 122 may use labeled search records 134 and labeled crawled documents 136 to predict one or more fixed sets of entities from fixed entity sets 132 given a set of signals. The labels may be created automatically or by human experts. The signals may be taken from content generated on a client device, such as device 150 or from search records, such as search records 134 or user-specific records such as screen capture index 172. In a training mode the set prediction model 122 may also take in a location as a signal (e.g., current geo cell location, coordinates, etc.) to predict a set of entities for the given location. During training the parameters of the model are updated to better reflect the labels assigned to text in the training documents. In an inference mode, the set prediction model 122 will predict one or more fixed entity sets from fixed entity sets 132 in response to a set of features that represents the signals. Each predicted set may have an associated confidence score or probability score indicating a level of certainty that the features provided predict the particular fixed set of entities. In some implementations, the confidence score may be based on a similarity measure which may differ depending on the type of set. For example, the confidence score for a location-based sets may be based on physical distance from a specified location, e.g., the current location of a computing device. The confidence score for a topic-based set may be based on an embedding distance with a query, such as an embedding generated based on signals from a client device. Such signals can include text recently seen on the screen, the state or proximity of external devices, content of recent searches, stated user interests, an application installed or executing on the client device, a time stamp, etc., Once trained, and then on a periodic basis to account for updates, the entity set generation engine 120 may provide the set prediction model 122 to the client device 150. The client device 150 may store the model as set prediction model 164. In some implementations, the client device 150 may personalize the set prediction model 164 by performing further training. The training may use information from search records associated with the user, for example from search records stored at client device 150 or screen capture index 172. Thus the set prediction model 164 may be a copy of set prediction model 122 or a personalized copy of set prediction model 122.

The server 110 may include search records 134 and crawled documents 136. The search records 134 may include search logs, aggregated data gathered from queries, or any other data based on queries. In some implementations, the search records 134 may be generated by a search engine in the normal process of generating search results. In some implementations, the search records 134 may be stored on a different computing device that is accessible to server 110. In some implementations, the search records may be distributed across a plurality of computing devices. The crawled documents 136 may be documents obtained using known or later developed web-crawling techniques, for example. In some implementations, the crawled documents 136 represent documents available over the Internet and may be an indexed form of the documents.

Figure 10:
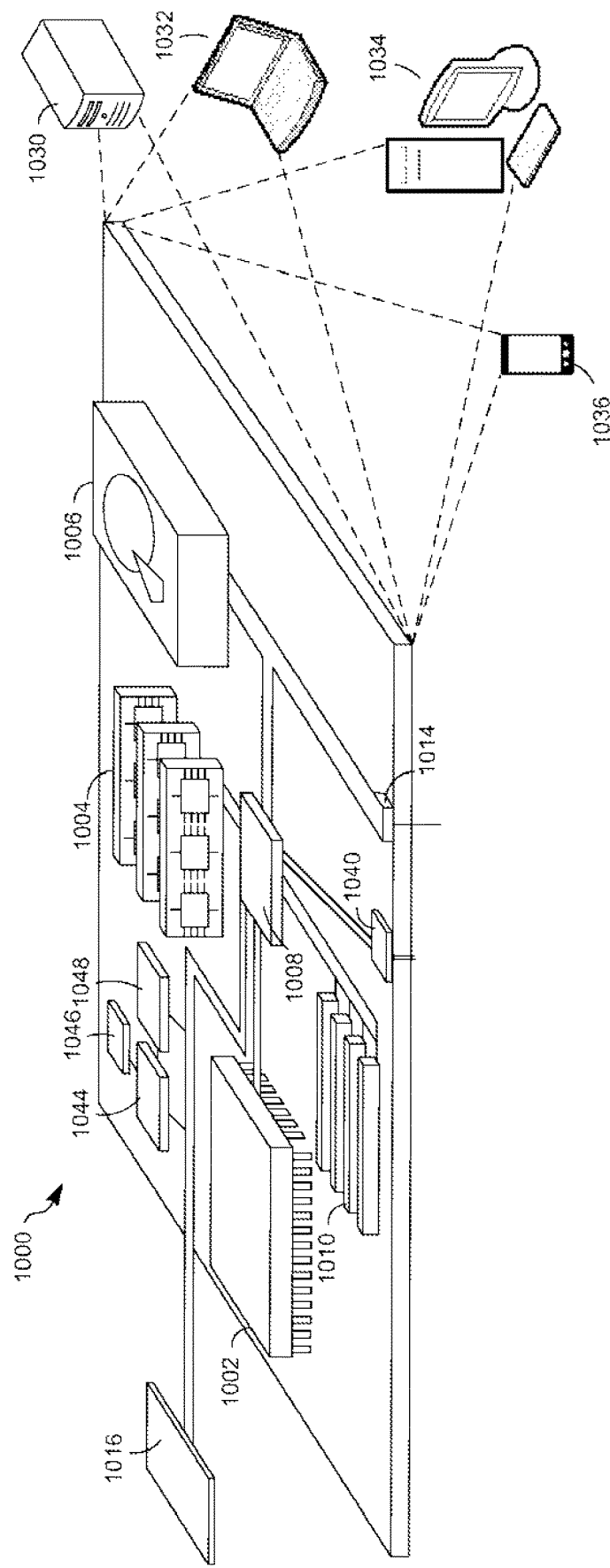
FIG. 10 shows an example of a computer device that can be used to implement the described techniques.

The personalized entity repository system 100 may include a computing device 150. Computing device 150 may be any mobile computing device, such as a smartphone or other handheld computing device, a tablet, a wearable computing device, etc., that operates in a closed mobile environment rather than a conventional open web-based environment. Computing device 150 may also be other types of personal electronic computing devices, such as a laptop or net-based computer, a desktop computer, a television with a processor, etc. Computing device 150 may be an example of computer device 1000 or 1050, as depicted in FIG. 10. Computing device 150 may be a computing device used by a single user, or can be a computing device shared by multiple users.

Computing device 150 may include one or more processors formed in a substrate configured to execute one or more machine executable instructions or pieces of software, firmware, or a combination thereof. The processors can be semiconductor-based—that is, the processors can include semiconductor material that can perform digital logic. The computing device 150 may thus include one or more computer memories configured to store one or more pieces of data, either temporarily, permanently, semi-permanently, or a combination thereof. The computing device 150 may thus include applications 155, which represent machine executable instructions in the form of software, firmware, or a combination thereof. The components identified in the applications 155 may be part of the operating system or may be applications developed to run using the operating system. In some implementations, applications 155 may be mobile applications. Conventionally, mobile applications operate in a closed environment, meaning that the user employs separate applications to perform activities conventionally performed in a web-based browser environment. For example, rather than going to bookit.com to book a hotel, a user of the computing device 150 can use a mobile application in applications 155 provided by bookit.com. Applications 155 may also include web applications, which may mirror the mobile application, e.g., providing the same or similar content as the mobile application. In some implementations, the applications 155 may include functions performed by an operating system of the computing device 150.

The applications 155 may include a screen content agent 160 and a set identification engine 162. In some implementations, one or more of these applications can be provided by the operating system (not shown) of the computing device 150. In some implementations, one or more of these applications can be downloaded and installed by the user.

The screen content agent 160 can include various functionalities. In some implementations, the screen content agent 160 may be configured to get textual information represented on the screen of the computing device from an application program interface (API). In some implementations, the screen content agent 160 may be built into the operating system, which can determine the content of text fields displayed on the screen. The textual information may be considered screen captured content, and each call to the API or each time the content of text fields is determined may be considered a screen capture. In some implementations, the screen content agent 160 may be configured to capture the image displayed on the screen by copying or reading the contents of the device's frame buffer. Thus, the captured screen may be an image and may be referred to as a captured image. The screen content agent 160 may capture the screen at intervals. The interval can be small, for example every half second or every second. In some implementations, the screen content agent 160 may be configured to capture the screen every time a touch event occurs (e.g., every time the user touches the screen to scroll, zoom, click a link etc.), in response to an explicit user request or command, or when the device transitions from one mobile application to another mobile application. In some implementations, the screen content agent 160 may increase the interval at which a screen capture occurs when the screen does not change. In other words, when the screen is static, the screen content agent 160 may capture images less often.

The screen content agent 160 may provide the captured content or screen images and metadata to a recognition engine, which may be part of the screen content agent 160 and located on the computing device 150. In some implementations, the recognition engine may be located at a server, such as server 110. When a screen capture image is provided to the recognition engine, the recognition engine may perform image and text recognition on the image to identify words, entities, logos, etc. in the content of the screen capture image. The recognition engine may be configured to perform various types of recognition, such as character recognition, image recognition, logo recognition, etc., using conventional or later developed techniques. Thus, the recognition engine may generate recognized content, which can be from words as well as from images.

The screen content agent 160 may also determine and use metadata about the screen capture image. The metadata may include the timestamp, the mobile device type, a mobile device identifier, the mobile application running when the content was captured, e.g., the application that rendered the content displayed on the screen, etc. In some implementations, the metadata may also include which applications are active, the location of the device, ambient light, motion of the device, etc. In some implementations, the metadata may include signals from other computing devices. For example, the screen content agent 160 may be provided or may obtain information from external devices such as appliances, televisions, personal assistants, music devices, alarm systems, etc., that are configured to communicate with the client device 150. For instance, a voice-activated electronic list making device may store a list of grocery items to be purchased. This list may be transmitted to the client device 150 either directly from the electronic list making device or via user account information. As another example, a user may have a tablet and a smartphone that share information or a husband and a wife may have smartphones that share information. Thus, in some implementations, the information available to the client device 150 may include information that is provided by other devices. Some or all of this information can be included in metadata associated with a screen capture image.

The system may use the metadata and information obtained via the screen capture image to assist in on-device intelligence that analyzes the information to assist the user with tasks performed on the mobile device. For example, a user having a conversation with a friend may include the suggestion to see a movie. On-device intelligence may identify the suggestion and offer an action for viewing a movie review or for buying tickets. The screen content agent 160 may use an entity repository to determine whether recognized content includes known entities. While the screen content agent 160 may use a public entity repository, such as entity repository 130, this requires a connection with server 110 and can slow down the recognition and action suggestion process. Accordingly, the client device 150 may have a personalized entity repository 176, stored on the client device 150. The personalized entity repository 176 may be a collection of fixed sets of entities, which are obtained from the server 110, for example from fixed entity sets 132. The personalized entity repository 176 may be generated and maintained by the set identification engine 162.

In some implementations, the screen content agent 160 can include an indexing engine configured to index the captured content. The index may also associate a screen capture image with the text, entities, images, logos, etc. identified in the image. Thus, for example, the indexing engine may generate index entries (e.g., stored in screen capture index 172) for a captured image and captured content. In some implementations the indexing engine may be on a server, such as server 110, and the screen content agent 160 may provide the captured image and captured content to the server. The index may be an inverted index, where a key value (e.g., word, phrase, entity, image, logo, etc.) is associated with a list of images (e.g., copies of the captured screen images) that include the key value. The index may include metadata (e.g., where on the captured image the key value occurs, a rank for the key value for the image, etc.) associated with each captured image in the list. In some implementations, the index may also include a list of captured images indexed by a timestamp. The indexing engine may store the index in memory, for example in screen capture index 172. Of course, in some implementations the system may store the index in a user account on a server in addition to or instead of on the computing device 150. The user of the computing device 150 may control when the screen content agent 160 is active. For example, the user may specify that the screen content agent 160 is active only when other specified applications 155 are running (e.g., only when in a social media mobile application). The user may also manually turn the screen content agent 160 on and off, for example via a settings application. In some implementations, the user may invoke the screen content agent 160 with a gesture or action. Disabling the screen content agent 160 may also disable the prediction and maintenance of the personalized entity repository described herein.

The computing device 150 may also include a set identification engine 162. The set identification engine 162 may be configured to determine which sets of entities in the fixed entity sets 132 should be included in the personalized entity repository 176. The set identification engine 162 may use information collected or generated by the screen content agent 160 as well as a set prediction model 164 and set usage parameters to determine which sets are potentially relevant to the user and obtain those sets from the server 110. For example, the set identification engine 162 may collect signals as input for the set prediction model 164. The signals can include information and metadata such as device location, a time of day, the state of various external devices in communication with the client device 150, proximity to other devices, information from content in a screen capture image or a series of screen capture images, information from the screen capture index 172 or search records for the user, information in a user profile, etc. As explained above, external devices such as appliances, televisions, personal assistants, music devices, alarm systems, etc., may be configured to communicate with and provide status information to the client device 150 and the status information may be included in the signals generated by the identification engine 162. The information used to generate signals may be stored as metadata in the screen capture index 172 or generated/collected at the time the set identification engine 162 determines the fixed sets of entities appropriate for the personalized entity repository 176.

As discussed earlier, the set prediction model 164 may be a copy of set prediction model 122 or may be a personalized version of set prediction model 122. When prediction model 164 is a personalized version, the set identification engine 162 may provide training examples from data stored on the client device 150 or from a user profile associated with the user of client device 150. For example, the training examples may be generated using the screen capture index 172 or search records for the user 180. In some implementations, the client device, with user permission, may provide updates to the set prediction model 122 on the server 110 so that the set prediction model can learn from predictions made over many client devices.

The set identification engine 162 may provide signals, for example as a set of features, to the set prediction model 164 in an inference mode. In response, the set prediction model 164 may then provide the identifiers of one or more predicted fixed sets of entities to the set identification engine 162. The set identification engine 162 may then rank the predicted fixed sets of entities. The client device 150 may be a device with a small form factor, which limits storage space on the device. Accordingly, the set identification engine 162 may rank the predicted fixed sets of entities to determine which fixed sets to include in personalized entity repository 176. In some implementations, the set identification engine 162 may work within set usage parameters selected by the user of the client device. The set usage parameters may include a maximum quantity of fixed sets to store on the client device, a maximum amount of storage used by the personalized entity repository 176, a minimum rank, or a combination of these. If the quantity of predicted sets cannot be accommodated on the client device 150, the set identification engine 162 may select as many of the highest ranked sets as the set usage parameters accommodate.

In some implementations the ranking may be determined by the set prediction model 164. In some implementations, the set identification engine 162 may adjust rankings provided by the set prediction model 164. For example, if a particular fixed set is needed by a web application the user accesses often or has just installed, the set identification engine 162 may boost the ranking of that particular fixed set. The set identification engine 162 may also use metadata to adjust rank. For example, if Alice and Ted are travelling and have provided consent to share data, the client device for Alice may determine that the client device of Ted already has a particular fixed set included in the personalized entity repository on his device. Accordingly, when the Alice's client device detects Ted's device in close proximity, the set identification engine 162 on Alice's device may demote the ranking of that particular fixed set on her device.

In some implementations, the set identification engine 162 may generate the ranking of predicted fixed sets on a periodic basis or after some event, such as the install of a new application, the activation of an application that has not been used for a predetermined period of time, when the available space changes, e.g., the device becomes low on disk space (e.g., falls below a specified percentage) or some action that frees up a specified percentage of space, when the user changes location, etc. The set identification engine 162 may also update the personalized entity repository 176 in response to the ranking. For example, the set identification engine 162 may update the personalized entity repository 176 periodically, when an application using a particular fixed set of entities is installed, or when a rank for a fixed set of entities becomes more highly ranked that one of the sets currently in the personalized entity repository 176. For example, if Alice begins researching a trip to Hawaii, eventually the set prediction model 164 will predict a fixed slice related to Hawaii based on content (e.g., from screen capture index 172 or search records) Alice has been viewing. Because this set has previously never ranked high enough to be included in personalized entity repository 176, once the rank does exceed the rank of a set currently in the personalized entity repository 176 or when a change in rank exceeds some predetermined threshold, the set identification engine 162 may automatically update the personalized entity repository 176 or may obtain approval from Alice before including this particular set. Once Alice returns from Hawaii or if she does not go and does not access content on Hawaii for a period of time, the rank of the particular slice may fall, e.g., fall below another slice not in the personalized entity repository 176 or fall a predetermined percentage. This may trigger execution of the set identification engine 162 so that another slice (i.e., another fixed set of entities) may take its place in the personalized entity repository 176.

Updating the personalized entity repository 176 may be accomplished in a variety of ways. In some implementations, the entire repository is deleted and replaced by fixed sets selected based on a rank and the set usage parameters. In some implementations, the set usage parameters may be set and controlled by the user. In some implementations the set identification engine 162 may determine whether a particular fixed set that should be in the personalized entity repository 176 already exists in the personalized entity repository 176. If it does the set identification engine 162 may either do nothing or determine if the set has changed, e.g., has been updated at server 110. If an update has occurred the set identification engine 162 may download the entire set or may download a delta to apply to the set. The set identification engine 162 may delete sets from the personalized entity repository 176 to make room for sets with a higher rank.

The computing device 150 may be in communication with the server 110 and with other mobile devices over network 140. Network 140 may be for example, the Internet, or the network 160 can be a wired or wireless local area network (LAN), wide area network (WAN), etc., implemented using, for example, gateway devices, bridges, switches, and/or so forth. Network 140 may also represent a cellular communications network. Via the network 140 the server 110 may communicate with and transmit data to/from computing device 140 and computing device 140 may communicate with other mobile devices (not shown).

The personalized entity repository system 100 represents one example configuration and implementations may incorporate other configurations. For example, some implementations may combine one or more of the components of the screen content agent 160, the set identification engine 162, or the set prediction model 164 into a single module or engine. Similarly, some implementations may combine one or more of the entity set generation engine 120 or the set prediction model 122 into a single module or application. As another example one or more of the data stores, such as the screen capture index 172, the personalized entity repository 176, or user profiles on client device 150 or entity repository 130, fixed entity sets 132, search records 134, or crawled document 136, may be combined into a single data store or may distributed across multiple computing devices, or may be stored at another location.

To the extent that the personalized entity repository system 100 collects and stores user-specific data or may make use of personal information, the users may be provided with an opportunity to control collection of the user information (e.g., information about a user's social network, social actions or activities, a user's preferences, or a user's current location), or to control whether and/or how to store screen capture images and content. For example, the system may refrain from capturing content for certain applications, such as banking applications, health applications, or other similar applications or where capturing such content violates terms of service. In addition, the user may be provided with the opportunity to disable capturing screen content for specific applications or categories of applications. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a personalized entity repository system.

Figure 2:
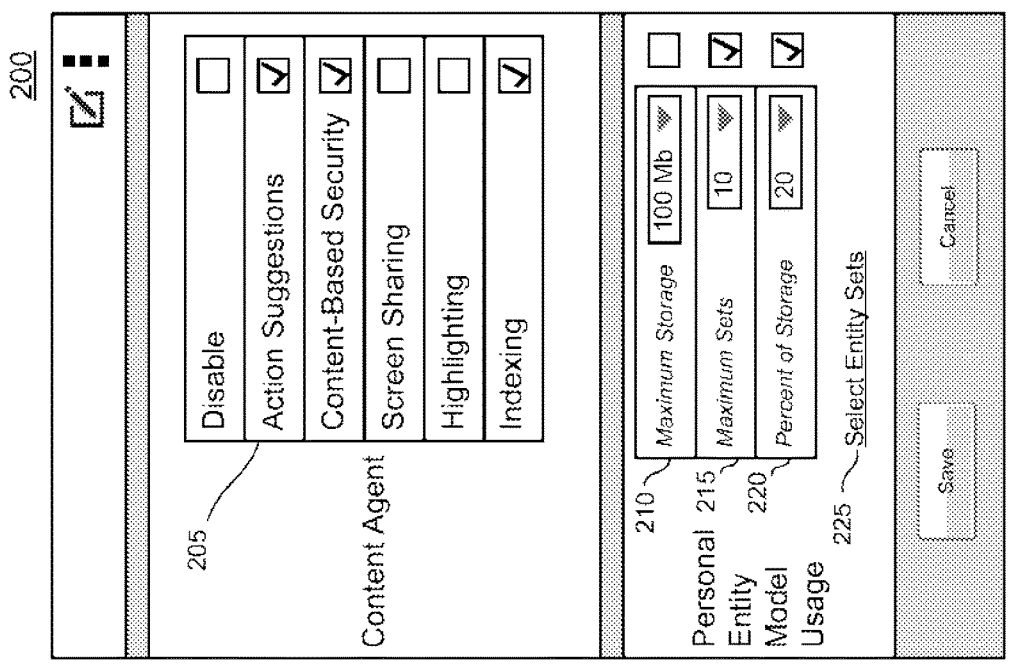
FIG. 2 illustrates an example display of a user interface for specifying set usage parameters for a personalized entity repository, in accordance with the disclosed subject matter.

FIG. 2 illustrates an example display of a user interface 200 for specifying set usage parameters for a personalized entity repository, in accordance with the disclosed subject matter. The display may be a display of a mobile device or other personal computing device, such as client device 150 of FIG. 1. In some implementations, the user interface may be provided by the operating system of the client device or may be provided by a particular application, e.g., from applications 155 of FIG. 1. The user interface 200 includes controls 205 for a content agent, such as content agent 160 of FIG. 1. The controls 205 may regulate whether and how the content agent executes and what actions the content agent performs. The user interface 200 may also include set usage parameters for a personalized entity repository. The set usage parameters may include one or more of a maximum storage 210, a maximum number of sets 215, or a percent of storage 220. The maximum storage 210 may set a limit on the amount of memory used by a personalized entity repository, such as personalized entity repository 176 of FIG. 1. The client device may download and store fixed sets of entities (slices) but not to exceed the maximum storage 210.

The set usage parameters may also include maximum sets 215. The maximum sets 215 limits the number of fixed sets of entities that the client device will include in the personalized entity repository. In other words, the client device may download and store only a specified number of sets. The percent of storage 220 may offer a flexible limit on the size of the personalized entity repository. For example, when the client device has more memory, the percent of storage 220 parameter may allow a larger personalized entity repository, but as space on the client device diminishes, the parameter may limit the sets stored in the personalized entity repository. The user interface 200 may also enable the user to select a combination of set usage parameters, e.g., via checkboxes, to turn on or off set usage parameters. Thus, the user may control the size of the personalized entity repository on their device, which in turn controls which slices are included in the repository. The user interface 200 may also include a control 225 that enables the user to specifically select one or more sets of entities for inclusion in the personalized entity model. When the user specifically uses the control 225 to select a slice of the entity repository, the system may rank the relevancy of that slice high, so that it is always included in the personalized entity model.

Figure 3:
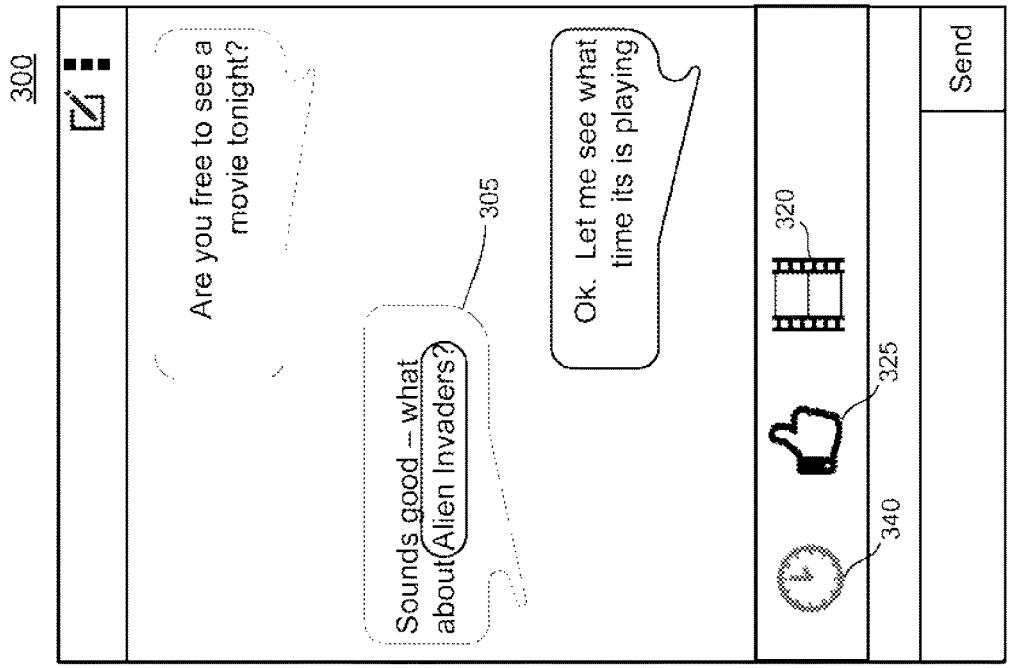
FIG. 3 illustrates an example display of content that provides context for determining which sets are most relevant to a user of the computing device, in accordance with disclosed implementations.

FIG. 3 illustrates an example display 300 of content that provides context for determining which sets are most relevant to a user of the computing device, in accordance with disclosed implementations. The display 300 may be a display of a mobile device or other computing device, such as client device 150 of FIG. 1. In the example of FIG. 3, the text "Alien Invaders" is selected. The selection may have been made by a user or may have been made automatically by the client device (e.g., a content agent or operation suggestion application running on the client device). The system has provided four suggested operations for the selection 305, namely operation 340, which may be for a mobile application that provides local movie times, a movie review operation 325, and a movie database operation 320. The user interface may have selected operation 340, 325, and 320 based on identification of selection 305 as an entity that exists in the personalized entity repository. Thus, the system may provide display 300 even without connection to a server and to a server-based entity repository.

Figure 4:
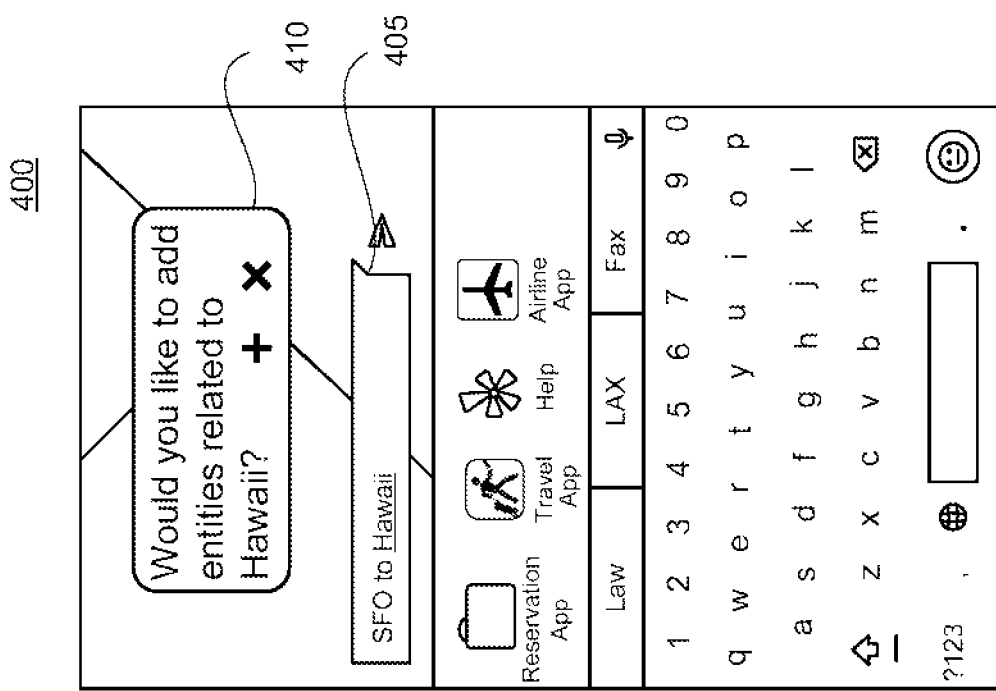
FIG. 4 illustrates an example display of a user interface for suggesting additional sets for inclusion in a personalized entity repository, in accordance with disclosed implementations.

FIG. 4 illustrates an example display of a user interface 400 for suggesting additional slices for inclusion in a personalized entity repository, in accordance with disclosed implementations. The user interface 400 may be generated on a mobile device or other computing device, such as client device 150 of FIG. 1. In the example of FIG. 4, a user has entered text into a search interface 405. Search interface 405 may be for a browser or a browser-like mobile application, but could be from any search bar in any application. The system may analyze the text provided to the search interface 405 and determine, e.g., via a set identification engine using a set prediction model, that the text is highly relevant to a topic-based fixed set of entities. The high relevancy may be determined based on a high confidence score or probability from the set prediction model. The high relevancy may be based not only on the content of the user interface 400 by also on previously presented content. For example, the user may have been looking at hotels in Hawaii in a booking application or may have been reading about things to see in Hawaii. While the client device may not have an entity for Hawaii in the current personalized entity repository, the set prediction model may recognize several words or images that predict the set. In some implementation, the set identification engine may be continuously analyzing text for relevant models. In some implementations, the set identification engine may be invoked during use of a search interface.

When the probability of the fixed set of entities indicates high relevancy, the system may automatically download and store the fixed set of entities for Hawaii, also referred to as the Hawaii slice. In some implementations, this may be a location-based set for all entities located in Hawaii, or a topic-based set, or a combination of these. In some implementations, the user interface may include confirmation window 410. Confirmation window 410 may enable the user to accept or reject the suggestion. If the user rejects the suggestion, the system may not download the Hawaii slice. If the user accepts the suggestion, the system may download the Hawaii slice, and may remove one or more slices currently in the personalized entity repository to make room for the new slice, as explained in more detail with regard to FIG. 7.

Figure 5:
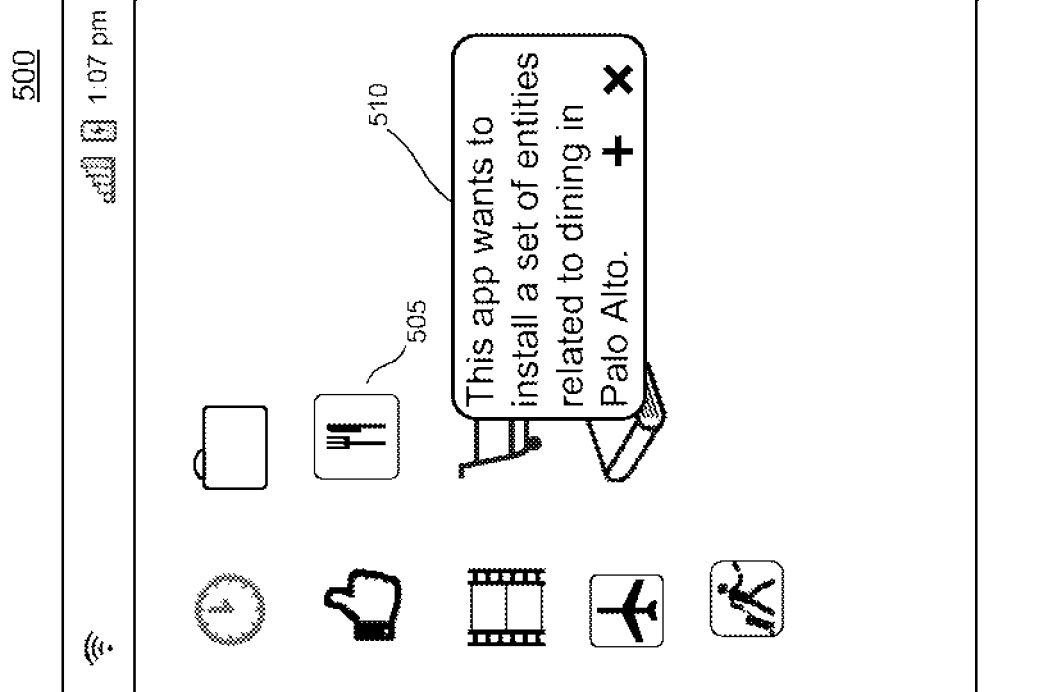
FIG. 5 illustrates another example display of a user interface for suggesting additional sets for inclusion in a personalized entity repository, in accordance with disclosed implementations.

FIG. 5 illustrates another example display of a user interface 500 for suggesting additional sets for inclusion in a personal entity repository, in accordance with disclosed implementations. The user interface 500 may be generated on a mobile device or other computing device, such as client device 150 of FIG. 1. In the example of FIG. 5, the user has just installed a dining reservation application 505. In response to the installation process the set identification engine may determine that the application 505 has expressly requested a particular fixed set of entities or, e.g., using a set prediction engine, is likely to refer to the particular fixed set. Accordingly, the user may be presented with confirmation window 510. Similar to confirmation window 410, the confirmation window 510 may provide the opportunity for the user to elect to download the particular slice or to reject the download. In some implementations, the application 505 may generate window 510. In some implementations (not shown) the application installation process or the set identification engine may automatically download the particular fixed set of entities.

Figure 6:
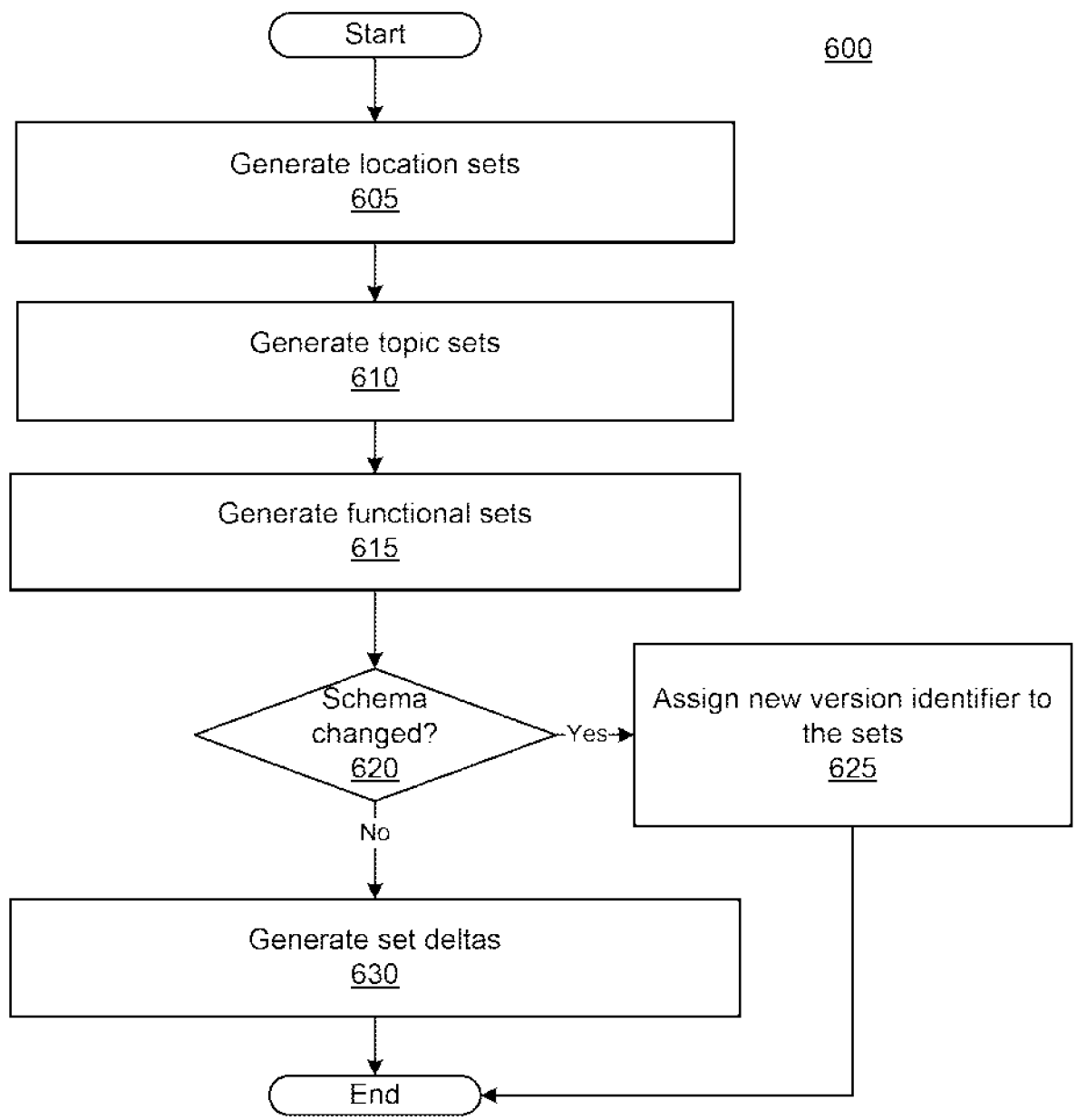
FIG. 6 illustrates a flow diagram of an example process for generating and updating fixed sets of entities, in accordance with disclosed implementations.

FIG. 6 illustrates a flow diagram of an example process 600 for generating and updating fixed sets of entities, in accordance with disclosed implementations. Process 600 may be performed by a personalized entity repository system, such as system 100 of FIG. 1. Process 600 may be used to generate and maintain various slices of an entity repository, i.e., fixed sets of entities. The entity repository may be any large entity repository, for example entity repository 130 of FIG. 1. Process 600 may begin by generating location-based sets of entities (605). A location-based set of entities may be any entities in an entity repository that are located in a particular cell. The cell may be defined by boundaries, for example by lines connecting three or more geographic coordinates. The cell may correspond to one or more geo cells (e.g., cells defined by a map application). The system may also generate topic-based fixed sets of entities (610). Topic-based sets may be formed by clustering, by similarity with or connection to a seed entity, by membership in a collection, etc. The system may also generate functional sets of entities (615). The functional sets may be combinations of location-based sets and topic sets, may be based on use by a particular application, may be based on popularity (i.e., the most commonly searched for entities and/or those appearing in the most crawled documents), may be based on a task or action, etc. Steps 605 to 615 may be performed at an initial time and to update sets. For example, at an initial time the system may perform steps 605 to 615 to generate initial sets of entities. Subsequently, the system may perform steps 605 to 615 to update the initial sets, add new sets, etc.

The system may version the fixed sets of entities. For example, when format changes to the set would cause an application that uses the sets to fail, the system may keep older versions and generate a new version after the schema change. In this manner, the system may handle schema changes in a manner that does not cause errors on client devices. Accordingly, the system may determine if the newly generated sets include a schema change (620). If so, the newly generated sets (e.g., from steps 605 to 615), may be assigned a new version identifier (625). The version identifier will enable applications that use the sets to correctly download and use appropriate versions. No delta set is needed when the updates involve a schema change. If there is no schema change (620, No), the system may generate a delta for each set (630). The deltas are used when the client devices download just changes to fixed sets of entities rather than doing a delete of all fixed sets in the personalized entity model followed by storing the most recent sets of highest ranked fixed entity sets for that device. A delta may be a list of entities to remove and a list of entities to add. Thus, an update to an entity, e.g., name change, metadata or attribute change, etc., may be a delete of the entity followed by reading the entity. Deltas enable the system to transmit less data between the server where the sets are maintained and the client devices where the sets are used. However, step 630 is optional, and may not be performed for all sets or for even for any sets. For example, the client device, when updating the personalized entity repository, may delete all currently stored slices and fetch the desired slices (e.g., the predicted slices that fall within set usage parameters) and store those as the personalized entity model. Each fixed set of entities may have a unique identifier. In some implementations, the unique identifier may be a hash of the contents of the fixed set. Process 600 then ends. Process 600 may be repeated periodically to ensure the fixed sets of entities are current.

Figure 7:
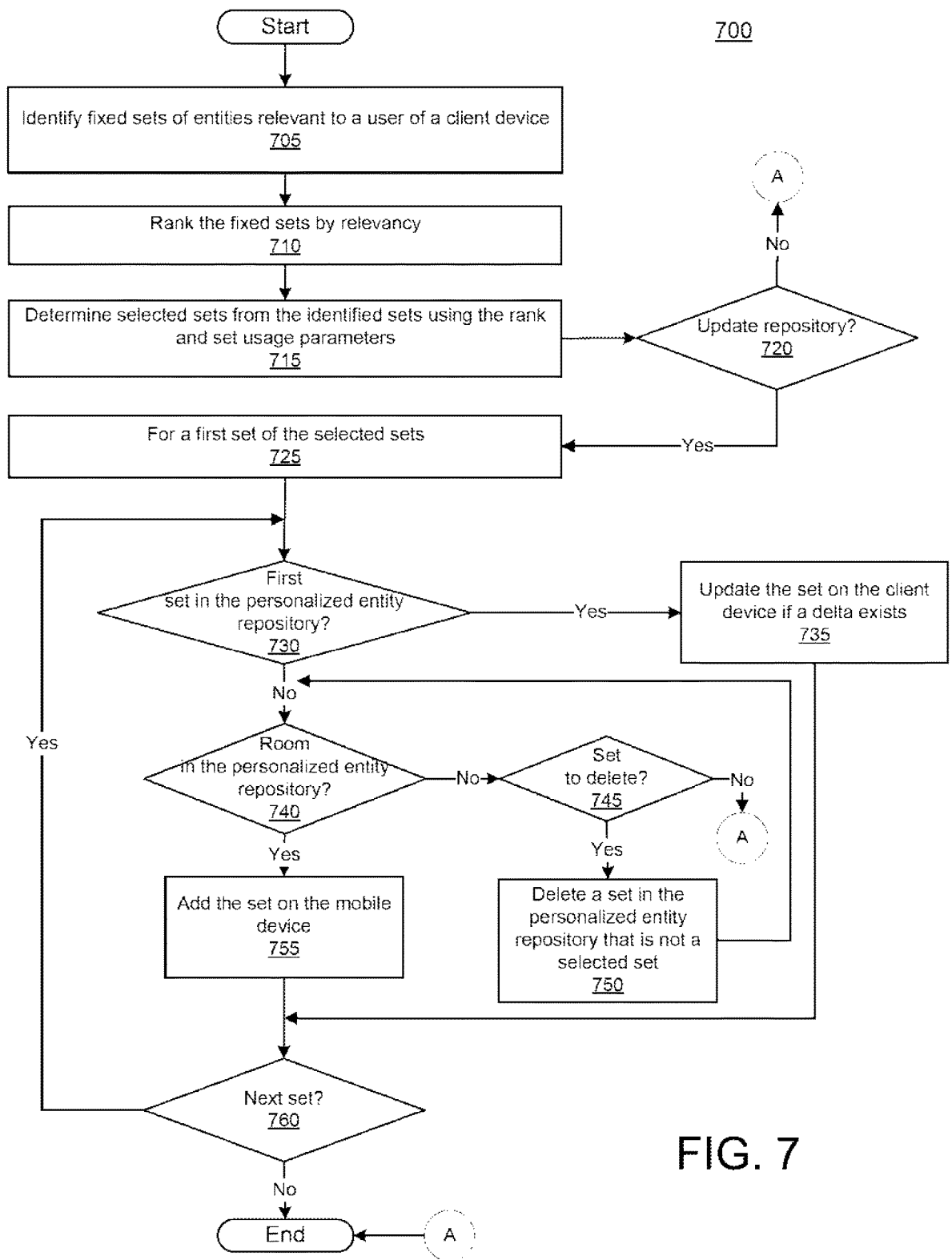
FIG. 7 illustrates a flow diagram of an example process for building a personal entity repository using fixed sets of entities, in accordance with disclosed implementations.

FIG. 7 illustrates a flow diagram of an example process 700 for building a personal entity repository using pre-computed sets of entities, in accordance with disclosed implementations. Process 700 may be performed by a personalized entity repository system, such as system 100 of FIG. 1. Process 700 may be performed on a client device to determine which fixed set of entities or slices are included in a personalized entity repository stored on the client device. The client device may perform process 700 continuously, on a periodic basis, upon network connectivity change, upon a triggering event, such as installation of a new application, an incoming phone call, addition of a new contact, etc., or user request of a synchronization. Process 700 may be performed by a set identification engine, such as set identification engine 162.

Process 700 may begin by identifying fixed sets of entities relevant to a user of a client device (705). The sets may be fixed in the sense that the sets are determined prior to performance of step 705 and not as part of step 705. In other words, the sets are determined independently of any particular user or query to the entity repository. The sets identified as part of step 705 are a much smaller subset than the total number of fixed sets. The identification of the fixed sets may be based, for example, on context associated with the client device. For example a set prediction model may be provided a set of features generated from a variety of signals (i.e., context) that can include metadata and information collected from content generated on the client device, for example via a content agent, search history, user profiles, etc. In some implementations the information used as a signal may include information from devices in proximity to the client device, e.g., from appliances or other computing devices in an Internet of Things home, from other personal computing devices associated with the user or the user's household, etc. Although such signals originate from another device, the proximity is context associated with the client device. In some implementations, the information may include the location of the computing device, a timestamp, content in a search history for the user, content in a screen capture index, content associated with a user profile, the applications installed on the client device, an activity performed by the user (e.g., changing device settings, installing an application), etc. The signals may be provided to the set prediction model, such as set prediction model 122 or set prediction model 164, which may in turn provide one or more predicted fixed sets of entities. The fixed sets of entities identified in step 705 may also be based on a location of the device, applications installed on the device, tasks or activities commonly performed on the device, etc.

The system may then rank the identified fixed sets of entities by relevancy (710). The relevancy may be based on the probability score provided by the set prediction model. In some implementations, the system may adjust that probability based on other information, such as location of the device, time of day, other devices in proximity, etc. For example, if two traveling companions have linked their devices, the device of the first companion may determine, e.g., via device to device signaling, that the device of the second companion has a particular slice of the entity repository stored and the device of the first companion may demote the relevancy of that slice, e.g., because one of the two devices already has that slice of the entity repository stored in the personalized entity repository. As another example, the user's device may have a particular application that requires a particular slice of the entity repository and the system may boost the relevancy of that particular slice. As another example, the system may boost the relevancy of a slice that is specified by the user, e.g., via control 225 of FIG. 2. For location-based fixed sets of entities, the system may set a relevancy score for the set based on the distance of the client device from the cell represented by the set. For example, when a client device is located within the cell, the relevancy may be very high. The relevancy of other cells may be based on the distance between a center of the cell and the current location of the client device, so that longer distances produce lower relevancy.

The system may determine selected sets for the personalized entity repository based on the set usage parameters and the ranks (715). In some implementations, the system may determine a relevancy threshold based on the set usage parameters and the ranks of the fixed entity sets identified as relevant to the user. Any sets with a relevancy score that meets the threshold may be included in the sets selected for the personalized entity repository. FIG. 9 is another example of the selection of the sets based on the set usage parameters and rank. The system may then determine whether the personalized entity repository needs to be updated (720). For example, if the selected fixed sets of entities are the same as the sets currently included in the personalized entity repository, but the system has not recently checked for updates, then the system may update the repository (720, Yes). As another example, if the system has been notified of an update to one of the fixed sets in the selected sets, the system may update the repository (720, Yes). If a fixed set of entities is in the selected sets but not currently in the personalized entity repository, the system may update the repository (720, Yes). If the system does not need to update the repository (720, No), process 700 ends.

If the system does update the repository (720, Yes), the system may select a highest ranked set of the selected sets (725). For ease of explanation this highest ranked set may be referred to as the first set. The system may determine if this first set is already in the personalized entity repository (730). If it is in the repository (730, Yes), the system may update the first set on the client device, if an update is needed (735). The system may determine if an update is needed by either pulling the first set from the server or by notification from the server that an update exists. The update may be in the form of a delta, e.g., a list of entities to delete and a list of entities to add to the fixed set. If the first set is not in the personalized entity repository (730, No), the system may determine if the personal entity repository has room for the first set (740). For example, the personal entity repository may have a limit on the number of sets in the repository or the memory used by the repository, or both. If the addition of the first set would exceed the limits (740, No), the system may determine whether there is a fixed set currently in the personalized entity repository that can be deleted (745). A set that is currently in the personalized entity repository can be deleted if it is not in the selected fixed sets of entities, i.e., those identified in step 715. A set can also be deleted if it has a lower rank that the first set. If there is a set to delete (745, Yes), the system may delete the set from the personalized entity repository (750) and return to step 740. If no sets can be deleted (745, No), process 700 may end.

When there is room for the first set in the personalized entity repository (740, yes), the system may add the first set to the personalized entity repository on the mobile device (755). The system may then determine whether there is a next highest ranked set in the selected sets (760). If there is a next highest set (760, Yes), the system may perform steps 725 to 760 for the next set. This next set then becomes the first set for the ease of explanation. Thus, for example, the system may determine if the next set, i.e., now the first set, is already in the personalized entity repository (730), etc. When all sets in the selected sets have been processed via steps 730 to 760 (760, No), the system has updated the personalized entity repository and process 700 ends.

Figure 8:
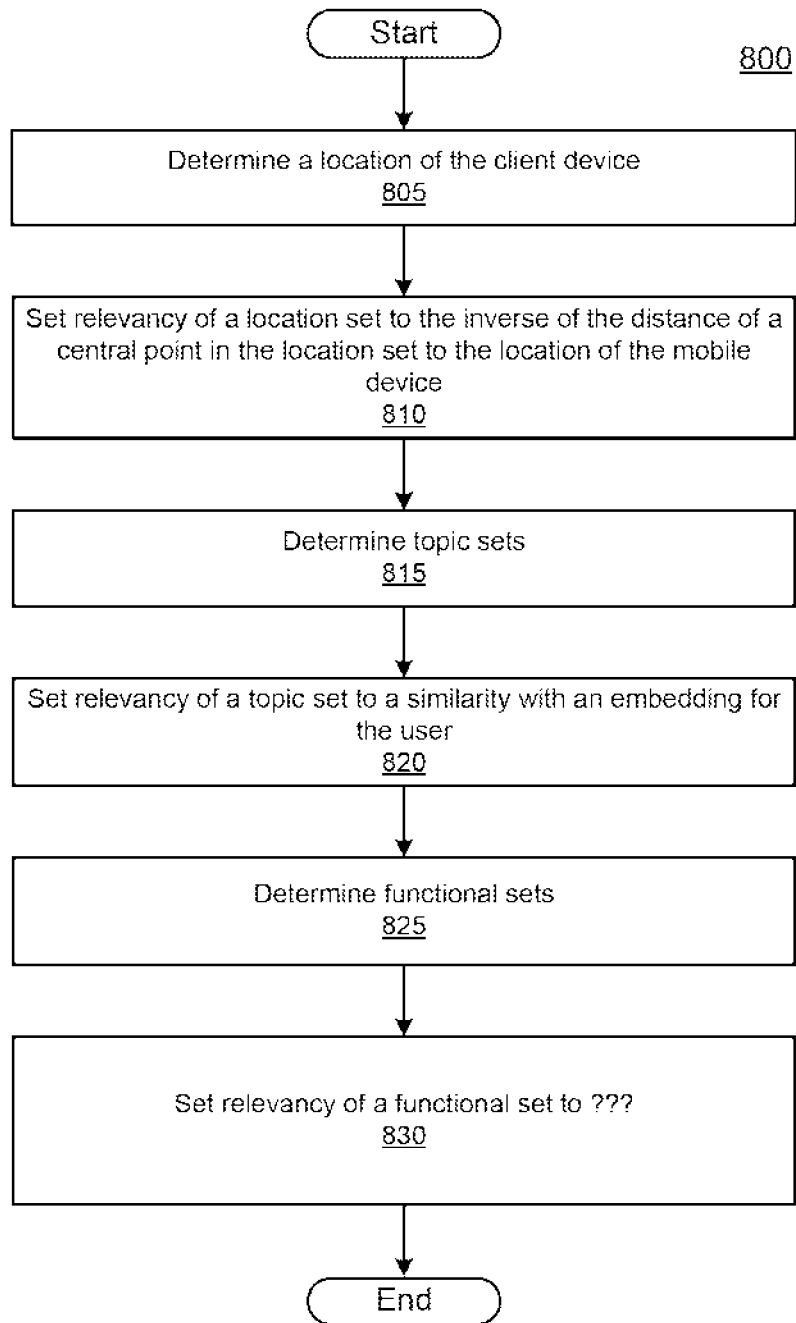
FIG. 8 illustrates a flow diagram of an example process for identifying fixed sets of entities relevant to a user of a client device, in accordance with disclosed implementations.

FIG. 8 illustrates a flow diagram of an example process 800 for identifying fixed sets of entities relevant to a user of a client device, in accordance with disclosed implementations. Process 800 may be performed by a personalized entity repository system, such as system 100 of FIG. 1. Process 800 may be performed on a client device as part of step 705 of FIG. 7 to determine which fixed set of entities or slices are relevant to a user. Process 800 begins by determining a location of the client device (805). The location may be expressed as coordinates, e.g., Global Positioning System (GPS) coordinates, or as the identifier of a geo cell, or some other methods of expressing a location on the Earth. The system may assign the relevancy of a location-based fixed set of entities based on the distance from the client device to the cell represented by the location-based fixed set (810). The distance may be measured from the location of the client device to a center of the cell. The relevancy may also have an inverse relationship to the distance, so that a shorter distance has a higher relevancy. When the client device is located in a cell for a particular fixed set of entities, the particular fixed set of entities may receive a highest relevancy score.

The system may also determine topic-based fixed sets of entities that are relevant to the user (815). The topic-based sets may be determined with a set prediction model, such as set prediction model 164 or set prediction model 122, that provides one or more identifiers for fixed sets of entities that are predicted based on features. The features may be based on a number of information items, such as the location of the device, content in search records, a user profile, or screen capture content, data from devices in proximity to the client device, e.g., exchanging data with the client device, a timestamp, applications installed or executing at the time, etc. The system may set the relevancy score of each topic-based fixed set of entities to a similarity with an embedding for the user of the client device (820). In some implementations, the similarity may be the probability associated with the fixed set provided by the set prediction model. The system may also determine functional fixed sets of entities (825). The functional sets may be entities deemed most popular, e.g., most commonly searched for entities, most commonly accessed entities, entities found most often in crawled documents, etc. The functional sets may also include entities used for a particular task, action, or application. For example, a functional set may include entities that enable the device to perform OCR in a particular language, or that are used by an art appreciation application, etc. Functional sets may also include combinations of location-based and topic-based sets, for example, movie theaters in Portland Oreg. or national monuments in Washington D.C. In some implementations, the system may use entity popularity as a relevancy score for a functional fixed set of entities. In some implementations, a fixed set may be ranked high based on an application that the user has installed. Process 800 then ends, having identified fixed sets of entities relevant to the user of the computing device and assigning a relevance score to each set.

FIG. 9 illustrates a flow diagram of an example process 900 for selecting fixed sets of entities from fixed sets of entities relevant to a user of a client device based on set usage parameters, in accordance with disclosed implementations. Process 900 may be performed by a personalized entity repository system, such as system 100 of FIG. 1. Process 900 may be performed on a client device as part of step 715 of FIG. 7 to determine which fixed set of entities or slices that are relevant to the user are selected for inclusion in a personal entity repository based on set usage parameters and rank. Process 900 begins by initializing set count and model size variables. The set count may be set to zero and the repository size may also be set to zero. The system may then select from the fixed sets identified as relevant the fixed set with the highest rank (910). The system may determine whether the set usage parameters include a quantity parameter (915). The quantity parameter is the maximum sets 215 of FIG. 2 and represents a limit on the number of fixed sets that can be in the personalized entity repository. If there is a quantity parameter (915, Yes), the system may increase the set count (920) by one. The system may then determine if the set count is greater than the quantity parameter (925). If it is, process 900 may end because the fixed set would go beyond the limits represented by the set usage parameters. However, for the highest ranked set, the set count is not greater than the quantity parameter (925, No), so the system continues with step 930.

The system determines if the set usage parameters include a space parameter (930). The space parameter may be expressed as a specified amount of memory (e.g., maximum storage 210 of FIG. 2) or a percentage of available memory (e.g., percentage of storage 220 of FIG. 2), or a combination of these. If the set usage parameters do include a space parameter (930, Yes), the system may add the size of the fixed set being examined to the repository size (953). The size may be known or may be estimated, for example, based on an average size of fixed sets of entities. The system may determine whether the repository size is greater than the space parameter (940). If it is (940, Yes), process 900 ends because the fixed set would violate a limit established by the set usage parameters. Otherwise (940, No), the system ads the set to the selected sets (945). The selected sets are the highest ranked fixed sets identified as relevant to the user that also meet limits established by the set usage parameters. If there is another set in the identified sets (e.g., the fixed sets identified as relevant to the user), 950, Yes, the system may select the next highest ranked set (955) and continue with steps 915 to 950 ad described above. If no other sets exist in the identified sets (950, No), process 900 ends, having identified sets to be included in the repository based on the set usage parameters.

FIG. 10 shows an example of a generic computer device 1000, which may be operated as server 110, and/or client device 150 of FIG. 1, which may be used with the techniques described here. Computing device 1000 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 1000 includes a processor 1002, memory 1004, a storage device 1006, and expansion ports 1010 connected via an interface 1008. In some implementations, computing device 1000 may include transceiver 1046, communication interface 1044, and a GPS (Global Positioning System) receiver module 1048, among other components, connected via interface 1008. Device 1000 may communicate wirelessly through communication interface 1044, which may include digital signal processing circuitry where necessary. Each of the components 1002, 1004, 1006, 1008, 1010, 1040, 1044, 1046, and 1048 may be mounted on a common motherboard or in other manners as appropriate.

The processor 1002 can process instructions for execution within the computing device 1000, including instructions stored in the memory 1004 or on the storage device 1006 to display graphical information for a GUI on an external input/output device, such as display 1016. Display 1016 may be a monitor or a flat touchscreen display. In some implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk. In some implementations, the memory 1004 may include expansion memory provided through an expansion interface.

The storage device 1006 is capable of providing mass storage for the computing device 1000. In one implementation, the storage device 1006 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 1004, the storage device 1006, or memory on processor 1002.

The interface 1008 may be a high speed controller that manages bandwidth-intensive operations for the computing device 1000 or a low speed controller that manages lower bandwidth-intensive operations, or a combination of such controllers. An external interface 1040 may be provided so as to enable near area communication of device 1000 with other devices. In some implementations, controller 1008 may be coupled to storage device 1006 and expansion port 1014. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1030, or multiple times in a group of such servers. It may also be implemented as part of a rack server system. In addition, it may be implemented in a computing device, such as a laptop computer 1032, personal computer 1034, or tablet/smart phone 1036. An entire system may be made up of multiple computing devices 1000 communicating with each other. Other configurations are possible.

FIG. 11 shows an example of a generic computer device 1100, which may be server 110 of FIG. 1, which may be used with the techniques described here. Computing device 1100 is intended to represent various example forms of large-scale data processing devices, such as servers, blade servers, datacenters, mainframes, and other large-scale computing devices. Computing device 1100 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1100 may include any number of computing devices 1180. Computing devices 1180 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1180a includes multiple racks 1158a-1158n. Each rack may include one or more processors, such as processors 1152a-1152n and 1162a-1162n. The processors may include data processors, network attached storage devices, and other computer controlled devices. In some implementations, one processor may operate as a master processor and control the scheduling and data distribution tasks. Processors may be interconnected through one or more rack switches 1158, and one or more racks may be connected through switch 1178. Switch 1178 may handle communications between multiple connected computing devices 1100.

Each rack may include memory, such as memory 1154 and memory 1164, and storage, such as 1156 and 1166. Storage 1156 and 1166 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1156 or 1166 may be shared between multiple processors, multiple racks, or multiple computing devices and may include a computer-readable medium storing instructions executable by one or more of the processors. Memory 1154 and 1164 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1154 may also be shared between processors 1152a-1152n. Data structures, such as an index, may be stored, for example, across storage 1156 and memory 1154. Computing device 1100 may include other components not shown, such as controllers, buses, input/output devices, communications modules, etc.

An entire system, such as server 110, may be made up of multiple computing devices 1100 communicating with each other. For example, device 1180a may communicate with devices 1180b, 1180c, and 1180d, and these may collectively be known as server 110. As another example, system 100 of FIG. 1 may include one or more computing devices 1100. Some of the computing devices may be located geographically close to each other, and others may be located geographically distant. The layout of system 1100 is an example only and the system may take on other layouts or configurations.

According to certain aspects of the disclosure, a mobile device comprises a display device, a personalized entity repository stored in memory, the personalized entity repository including a plurality of fixed sets of entities from an entity repository stored at a server, wherein each fixed set has a respective identifier and includes information about the entities in the set, at least one processor, and memory storing instructions that, when executed by the at least one processor, cause the mobile device to perform operations. The operation include identifying fixed sets of the entity repository that are relevant to a user of the mobile device based on context associated with the mobile device, ranking the fixed sets by relevancy, determining selected sets from the identified fixed sets using the rank and set usage parameters applicable to the user, and updating the personalized entity repository using the selected sets.

This and other aspects can include one or more of the following features. For example, updating the personalized entity repository may occur responsive to determining that a first fixed set of the identified fixed sets does not exist in the personalized entity repository. As another example, updating the personalized entity repository can include removing a set in the personalized entity repository that is not a selected set. As another example, the set usage parameters can include a quantity of fixed sets and/or an amount of memory allocated to the personalized entity repository, the amount being set by the user. As another example, the plurality of fixed sets stored in the personalized entity repository can include location sets, wherein entities in a location set are located in a same cell. As another example, the plurality of fixed sets stored in the personalized entity repository includes topic sets, wherein entities in a topic set are entities clustered together based on entity characteristics. In some implementations, the rank of a first topic set is a rank assigned by a prediction model based on items recognized in content generated for display on the display device. As another example, updating the personalized entity repository can include adding a fixed set that does not currently exist in the personalized entity repository and using a delta of a fixed set that exists in the personalized entity repository.

As another example, the operations may also include identifying an entity in content generated for display on the display device using the personalized entity repository. As another example, each of the plurality of sets has a version identifier, the version identifier changing when an update to a particular set breaks a schema of the personalized entity repository. As another example, the operations may also include initiate display of information that identifies a first fixed set from the selected sets and a control configured to enable the user to accept instillation of the first fixed set and download the first fixed set and add it to the personalized entity repository when the user accepts installation. As another example, identifying fixed sets of the entity repository that are relevant to the user based on the context can include determining a location of the mobile device and using the location to determine location-based fixed sets relevant to the user, using a set prediction model to identify topic-based sets relevant to the user, and determining sets identified by at least one application installed on the mobile device. As another example, identifying fixed sets of the entity repository that are relevant to the user based on the context can include determining content previously viewed on the mobile device and providing the content previously viewed to a set prediction model configured to predict at least one topic-based set from the content previously viewed and/or determining recent searches conducted on the mobile device and providing the content from the recent searches to a set prediction model configured to predict at least one topic-based set from the content. As another example, identifying fixed sets of the entity repository that are relevant to the user based on the context can include determining an activity performed by the user of the mobile device and predicting a fixed set of entities based on the activity.

According to certain aspects of the disclosure, a method includes receive a screen captured image configured to display content on a display of a mobile device, determining text in the image by performing text recognition on the image, providing the text to a set prediction model, wherein the set prediction model is trained to predict one or more fixed sets of entities, and storing at least one fixed set of entities of the predicted fixed sets of entities in a personalized entity repository in memory on the mobile device.

These and other aspects can include one or more of the following features. For example, the method may also include identifying entities in screen capture images using the personalized entity repository. The method may also include determining a location associated with content recognized in a screen capture image, provide the location to the set prediction model, the set prediction model predicting at least one location-based fixed set of entities based on the location, and storing the location-based fixed set of entities in the personalized entity repository. As another example, the prediction model may predict a plurality of predicted fixed sets of entities and the method also includes ranking each of the predicted fixed sets of entities, using set usage parameters and the rankings to determine selected fixed sets of entities from the predicted fixed sets of entities and storing the selected fixed sets of entities in the personalized entity repository.

According to certain aspects of the disclosure, a method may include generating a plurality of fixed sets of entities from an entity repository. The fixed sets include location-based sets, each location-based set including entities from the entity repository that have a location inside a cell, the cell being associated with the set, and topic-based sets, at least some of the topic-based sets including entities from the entity repository that are related to each other via an embedding similarity. The method may also include providing a subset of the fixed sets of entities to a client device, the client device requesting the subset based on a location of the client device and on recognized items identified in content generated for display on the client device.

These and other aspects can include one or more of the following features. For example, the method may also include identifying at least one entity added to the entity repository, determining at least one fixed set that the added entity belongs to, and generating a delta for the at least one fixed set that includes the added entity. As another example, the method may also include identifying at least one entity added to the entity repository, determining at least one fixed set that the added entity belongs to, determining that a schema of the fixed sets has changed, and generating a new version of the at least one fixed set, the new version including the added entity and having a new version identifier. As another example, at least some of the topic-based sets may include entities similar to a seed entity and/or the fixed sets may also include functional sets, at least one of the functional sets including entities deemed most popular.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method implemented by one or more processors, the method comprising:
   receiving a screen capture image, the screen capture image capturing content displayed on a display of a mobile device;
   determining text in the screen capture image by performing text recognition on the screen capture image;
   processing the text using a trained set prediction model to predict one or more fixed sets of entities based on the text;
   storing at least one fixed set of entities of the predicted fixed sets of entities in a personalized entity repository in memory on the mobile device; and
   subsequent to storing the at least one fixed set of entities:
      using the stored at least one fixed set of entities to identify an entity in an additional screen capture image captured at the mobile device; and
      rendering, at the mobile device, content that is based on the identified entity.

2. The method of claim 1, further comprising:
   determining a location associated with content recognized in a further screen capture image;
   processing the location using the trained set prediction model to predict at least one location-based fixed set of entities based on the location; and
   storing the at least one location-based fixed set of entities in the personalized entity repository.

3. The method of claim 2, further comprising:
   using the stored at least one location-based fixed set of entities to identify a location-based entity based on data captured at the mobile device; and rendering, at the mobile device, further content that is based on the identified location-based entity.

4. The method of claim 1, wherein the trained set prediction model predicts a plurality of predicted fixed sets of entities and the method further comprises:
   ranking each of the predicted fixed sets of entities;
   using set usage parameters and the rankings to determine selected fixed sets of entities from the predicted fixed sets of entities, the selected fixed set of entities including the at least one fixed set of entities; and
   storing the selected fixed sets of entities in the personalized entity repository.

5. The method of claim 4, wherein the set usage parameters includes a quantity of fixed sets.

6. The method of claim 4, wherein the set usage parameters include an amount of memory allocated to the personalized entity repository.

7. A mobile device comprising:
   a display device;
   a personalized entity repository stored in memory, the personalized entity repository including a plurality of fixed sets of entities from an entity repository stored at a server, wherein each fixed set has a respective identifier and includes information about the entities in the set;
   at least one processor; and
   memory storing instructions that, when executed by the at least one processor, cause the mobile device to:
      capture a screen capture image that captures content displayed on the display device;
      cause text in the screen capture image to be processed using a trained set prediction model to predict one or more fixed sets of entities based on the text;
      store at least one fixed set of entities of the predicted fixed sets of entities in the personalized entity repository stored in the memory on the mobile device; and
      subsequent to storing the at least one fixed set of entities:
         use the stored at least one fixed set of entities to identify an entity in an additional screen capture image captured at the mobile device; and
         render, via the display device, content that is based on the identified entity.

8. The mobile device of claim 7, the memory further storing instructions that, when executed by the at least one processor, cause the mobile device to:
   cause a location, determined via data captured at the mobile device, to be processed using the trained set prediction model to predict at least one location-based fixed set of entities based on the location; and
   store the at least one location-based fixed set of entities in the personalized entity repository stored in the memory on the mobile device.

9. The mobile device of claim 8, the memory further storing instructions that, when executed by the at least one processor, cause the mobile device to:
   use the stored at least one location-based fixed set of entities to identify a location-based entity based on further data captured at the mobile device; and
   render, via the display device, further content that is based on the identified location-based entity.

10. The mobile device of claim 7, wherein the trained set prediction model predicts a plurality of predicted fixed sets of entities, ranks each of the predicted fixed sets of entities, and uses the set usage parameters and the rankings to determine selected fixed sets of entities from the predicted fixed sets of entities, wherein the selected fixed set of entities include the at least one fixed set of entities.

11. The mobile device of claim 10, wherein the set usage parameters includes a quantity of fixed sets.

12. The mobile device of claim 10, wherein the set usage parameters include an amount of memory allocated to the personalized entity repository.

13. A method implemented by one or more processors, the method comprising:
   receiving a screen capture image, the screen capture image capturing content displayed on a display of a mobile device,
   processing the screen capture image to determine a location associated with the content displayed in the screen capture image;
   processing the location using a trained set prediction model to predict one or more fixed sets of entities based on the location;
   storing at least one fixed set of entities of the predicted fixed sets of entities in a personalized entity repository in memory on the mobile device; and
   subsequent to storing the at least one fixed set of entities:
      using the stored at least one fixed set of entities to identify an entity in an additional screen capture image captured at the mobile device; and
      rendering, at the mobile device, content that is based on the identified entity.

14. The method of claim 13, wherein the trained set prediction model predicts a plurality of predicted fixed sets of entities and the method further comprises:
   ranking each of the predicted fixed sets of entities;
   using set usage parameters and the rankings to determine selected fixed sets of entities from the predicted fixed sets of entities, the selected fixed set of entities including the at least one fixed set of entities; and
   storing the selected fixed sets of entities in the personalized entity repository.

15. The method of claim 14, wherein the set usage parameters includes a quantity of fixed sets.

16. The method of claim 15, wherein the set usage parameters include an amount of memory allocated to the personalized entity repository.

17. The method of claim 14, wherein the set usage parameters include an amount of memory allocated to the personalized entity repository.

* * * * *